United States Patent [19]

Tennes et al.

[11] Patent Number: 4,745,564
[45] Date of Patent: May 17, 1988

[54] IMPACT DETECTION APPARATUS

[75] Inventors: Bernard R. Tennes, Charlotte; Galen K. Brown, Okemos; Joseph R. Clemens; Henry A. Affeldt, both of East Lansing, all of Mich.; Siamak Siyami, Tehran, Iran; Brian A. Klug, Buchanan; Hans R. Zapp, Okemos, both of Mich.

[73] Assignee: Board of Trustees Operating Michigan State University

[21] Appl. No.: 827,142

[22] Filed: Feb. 7, 1986

[51] Int. Cl.$^4$ .................. G01P 15/04; G01D 1/14; G06F 15/74
[52] U.S. Cl. .................... 364/566; 73/489; 346/33 R; 346/33 D; 364/550
[58] Field of Search .............. 364/550, 551, 566; 346/33 R, 33 D; 73/489

[56] References Cited

U.S. PATENT DOCUMENTS

| | | | |
|---|---|---|---|
| 4,023,396 | 5/1977 | Yakshin et al. | 364/566 |
| 4,114,450 | 9/1978 | Shulman et al. | 364/566 |
| 4,387,587 | 6/1983 | Faulconer | 73/489 |
| 4,395,624 | 7/1983 | Wartski | 346/33 D |

FOREIGN PATENT DOCUMENTS 3232416  3/1984  Fed. Rep. of Germany ...... 364/566

OTHER PUBLICATIONS

Porter: Shock Laboratory Data System Proceedings of the 21st International Instrumentation Symposium, May 1975, pp. 61–66.

Anderson and Parks, Scottish Institute of Agricultural Eng., (1984), "The Electronic Potato".
Halderson, Proceedings of the Nat'l. Conference on Agricultural Elect. Appl., Agri. Elect.–1983 and Beyond, vol. 2, pp. 773–780, A Telemetry Device for Impact Detection.
O'Brien, et al., Trans. of the ASAE, vol. 16, No. 2, pp. 245–247, (1971), Telemetry for Investigating Forces on Fruits during Handling.
Aldred, et al., ASAE Paper No. 77-1527, (1977), Telemetry and Microcomputer System Aids Investigation of Forces on Peaches during Mechanical Harvesting.
Hallee, "Telemetry Device for Monitoring the Damage Potential of Harvesting & Handling Equipment", PhD Thesis, Penn. State, (1981).

*Primary Examiner*—Felix D. Gruber
*Attorney, Agent, or Firm*—Ian C. McLeod

[57] ABSTRACT

An apparatus for measuring and recording accelerations or other physical quantities experienced by easily damaged items of commerce such as fruit and electronic computers. A triaxial accelerometer or other suitable sensor produces signals which are sampled by a microprocessor operating according to a program stored in a read-only memory. When the sampled accelerations or other physical quantities exceed a predetermined threshold, samples are stored in a random access memory, along with their times of occurrence. The apparatus provides a serial port for reading out the recorded acceleration data. The data may then be subjected to further processing externally.

27 Claims, 8 Drawing Sheets

Microfiche Appendix Included
(1 Microfiche, 45 Pages)

IMPACT DETECTION APPARATUS

MICROFICHE APPENDIX

This patent application includes a microfiche appendix containing a computer program. The appendix comprises one microfiche containing forty-five frames.

FIELD OF THE INVENTION

This invention relates to the measurement of accelerations experienced by items undergoing various handling operations and, more particularly, to an apparatus which can be fixedly attached to an item or placed among items to record all triaxial accelerations events which exceed a predetermined threshold and the times of occurrence of those acceleration events.

DESCRIPTION OF THE PRIOR ART

It is recognized that damage can occur to commodities, such as agricultural products and electronic products, while they are being handled and/or transported. The damage occurs when the commodities are dropped or otherwise subjected to high accelerations. This damage, including bruising of fruits and breakage of equipment components, can influence the consumer's perception of product quality and can require expensive repairs, making it important to ascertain at what point in their handling the goods are damaged.

A variety of studies, utilizing specialized equipment, have been conducted to determine the acceleration histories of various commodities.

As reported in "Telemetry for Investigating Forces on Fruits During Handling," Transctions of the ASAE, Volume 16, No. 2, pages 245–47 (1971), O'Brien et al adapted the use of FM telemetry to collect signals from a remote pseudo fruit included with other fruits during processing. The accelerations were measured by a triaxial accelerometer having a calibration accuracy estimated at plus or minus 5 percent and the magnitude of the accelerations were transmitted to a continuous antenna placed along the fruit handling path. The physical properties of each surface impacted by the fruit had to be measured to relate the accelerations experienced to the damage incurred. The system was lacking in reliability, could not accurately correlate internal shear with damage and was suitable for use only in the relatively controlled environment of a fruit handling path.

In 1977, Aldred et al. used a microcomputer to sample and record data regarding the acceleration of a pseudo peach, as reported in "Telemetry and Microcomputer System Aids Investigation of Forces on Peaches During Mechanical Harvesting," ASAE paper no. 77-1527. The data were first read out by a telemetry system. However, the instrument was not fully calibrated and no tests were performed to obtain data relating the accelerations experienced to the range of bruises caused.

A telemetry system was used again in conjunction with an artificial potato, as reported by Hallee in "Telemetry Device for Monitoring the Damage Potential of Harvesting and Handling Equipment," PhD thesis, Pennsylvania State University (1981). In this work, Hallee established the relationship between impact acceleration and impact damage, allowing prediction of impact damage based on the accelerations experienced by the artificial potato.

Anderson and Parks conclude, in "The Electronic Potato," Scottish Institute of Agricultural Engineering (1984), that a single axis accelerometer device could produce results which were evaluated in terms of "equivalent drop heights." These evaluated results gave a good indication of probable damage to the product for data evaluated in a telemetry device. However, a single axis accelerometer cannot measure three-dimensional accelerations, such as are experienced by a rolling fruit on a handling path.

The most recent work, also employing telemetry, was by Halderson, et al. It was published in "A Telemetry Device for Impact Detection," Proceedings of the National Conference on Agricultural Electronics Applications, Agricultural Electronics—1983 and Beyond, volume 2, pages 773–80. In this work Halderson performed a statistical analysis of telemetered acceleration signals, as well as impact energy levels, in order to calibrate each axis of a triaxial accelerometer.

Earlier systems for collecting environmental data concerning the handling and transportation of goods have used either a direct data read-out with a cable connected to the instrumentation or a data telemetry system. Because the data they collected was immediately passed on to instrumentation external to the sensing housing, these systems did not require a memory inside the sensing housing for storage of the data sensed. If a memory were provided, it would require a large capacity because the acceleration events of interest are short-lived and a high sampling rate is required to adequately characterize each event. Further, relatively little of the data collected would contain acceleration events of interest and much of the large memory would, therefore, be wasted.

In U.S. Pat. No. 4,387,587, Faulconer describes an apparatus and method whereby single axis decelerations of an automobile at a prescribed point along a highway or test track are sensed and stored if the magnitude of the deceleration exceeds a predetermined level. This substantially reduces the memory storage requirements. However, because of the controlled circumstances under which Faulconer's invention is to be used, the time of occurrence of the braking deceleration event is known and is therefore not recorded with the deceleration data. In the handling and transport of commercial goods, on the other hand, the time of the acceleration event is an important unknown to be recorded with the other data.

It is desirable, therefore, to provide a device which can (a) be physically packaged in such a way as to approximate the object or commodity being monitored or (b) be fixedly attached to a larger object, concurrently sense accelerations along each of three orthogonal axes, and (c) store both portions of the sensed acceleration events, where the magnitude of acceleration along at least one of the three coordinate axes exceeds a predetermined threshold, and the times of occurrence of those acceleration events so that they can be read out and analyzed at a more convenient time.

BRIEF DESCRIPTION OF THE INVENTION

This invention provides an apparatus adapted to measure and record the acceleration history of commodities while they are being handled or transported. The apparatus can be made in the shape of the commodity being monitored or attached to the object being monitored. It can sense accelerations along each of three coordinate axes. All three accelerations are stored as data if any one exceeds a predetermined acceleration magnitude. The apparatus also stores the time of occurrence of such accelerations, thereby providing an event-time history. This history can be read from the memory for analysis after the handling or transportation is completed.

According to one aspect of this invention, the detection apparatus comprises a housing containing three acceleration sensors, a microcomputer, and a battery. The microcomputer comprises memory means, a microprocessor, and clock means. The memory contains program instructions for the microprocessor and also serves to store the data collected by the sensors. Following transportation of the commodity, the data may be read out from the memory means, over a special port, to an external device for further processing. The analog signals produced by each of the accelerometers can be converted to digital signals by multiplexing these signals to an analog-to-digital converter. The microcomputer memory can be composed partly of random access memory (RAM) and partly of read-only memory (ROM): the ROM stores the program used by the microprocessor. The ROM can be electrically programmable (an EPROM) so that a new program can be entered through a port used to read out the stored data.

DETAILED DESCRIPTION OF A PREFERRED EMBODIMENT

Figure 1:
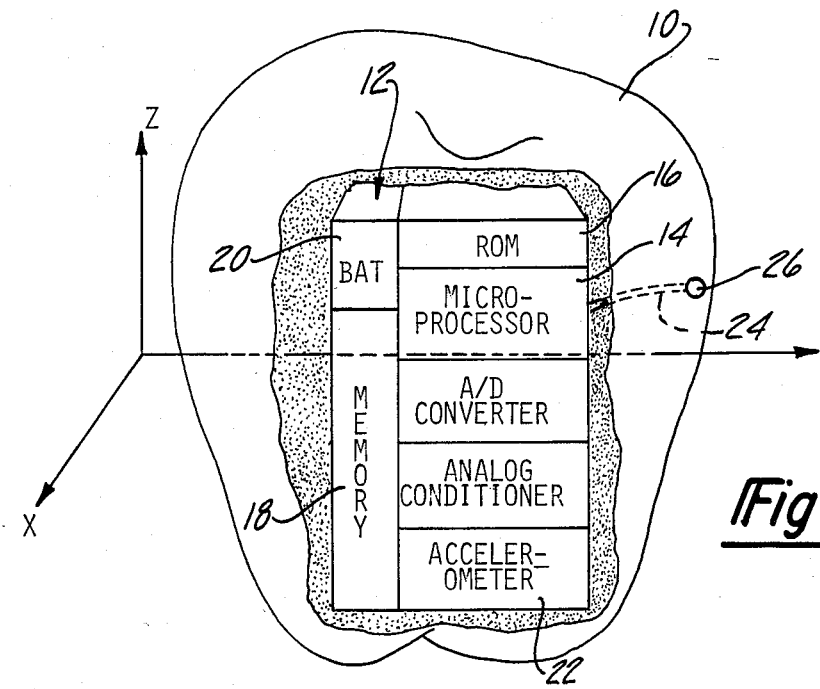
FIG. 1 is a cut-away view of the enclosure of the invention including the enclosed detection apparatus.

A better understanding of the details of the invention may be gained with reference to the figures of the drawings. In particular, FIG. 1 shows a fruit shaped housing 10 (here shaped like an apple) enclosing apparatus 12. Housing 10 is made from material which simulates the impact resistance and other behavorial characteristics of the object being tested. This enclosure may be made of a single uniform layer of material, multiple layers of materials, or other combinations of plastic and rubber which allow the accelerometers of the impact measuring apparatus to accurately measure the accelerations which can be correlated to those experienced by a real fruit.

Housing 10 is shaped similarly to the object being simulated so that, in transport or handling, it receives the same treatment as the simulated object. It completely encloses the electronics package 12, which is rigidly secured within housing 10 so that the electronics package experiences the accelerations which can be correlated to those that real apples undergo. Housing 10 can be made from EC-420 epoxy casting resin, produced by Ad-Tech Plastic Systems Corporation of Potterville, Mich. Using this casting resin, housing 10 can be cast around electronics package 12 and set in less than one day. At a 77° F. (i.e., room temperature) ambient temperature, the peak temperature reached inside the housing as it cures is 173° F., a temperature which nearly all electronics can survive. It can also be dissolved away from package 12 without requiring the destruction of package 12, thereby allowing for replacement of various components in package 12 (such as the battery 20). The resin can be dissolved by xylene, dimethyl chloride, or propanol. The casting resin can also be clear, permitting a visual inspection of the enclosed package 12 to assess the possibility of damage. A wide variety of such casting resins is available. It is possible to simulate the shape of virtually any fruit. EC-420 resin has a Shore D hardness of 70 and a tensile strength of 6000 pounds per square inch, making it suitable for coatings to simulate the hardness of various fruit. In other applications, housing 10 can be made to permit rigid attachment to the item to be monitored. An example of such an application is that of monitoring the shipping history of a computer to determine at what point any damage is likely to occur. In such applications, it is possible that it is not necessary to monitor all three coordinate accelerations.

Electronics package 12, completely enclosed within housing 10, comprises electronic components such as microprocessor 14, read only memory (ROM) 16, random access memory (RAM) 18, battery 20, and triaxial accelerometer means 22. Although triaxial accelerometer means 22 can have any orientation within housing 10, it will be assumed, without loss of generality, that the axes of triaxial accelerometer 22 are aligned with orthogonal coordinate axes x, y and z. Accelerometer 22 is actually constructed from three mutually perpendicular accelerometers which separately measure accelerations. Attached to microprocessor 14 is a signal line 24 which is connected to an electronic jack 26. Line 24 is attached to an appropriate signal port on the microprocessor 14 to permit asynchronous communications data, complying with the RS 232 timing, to be read out from the RAM 18 of apparatus 12. Once read out, these data can be further processed.

Figure 2:
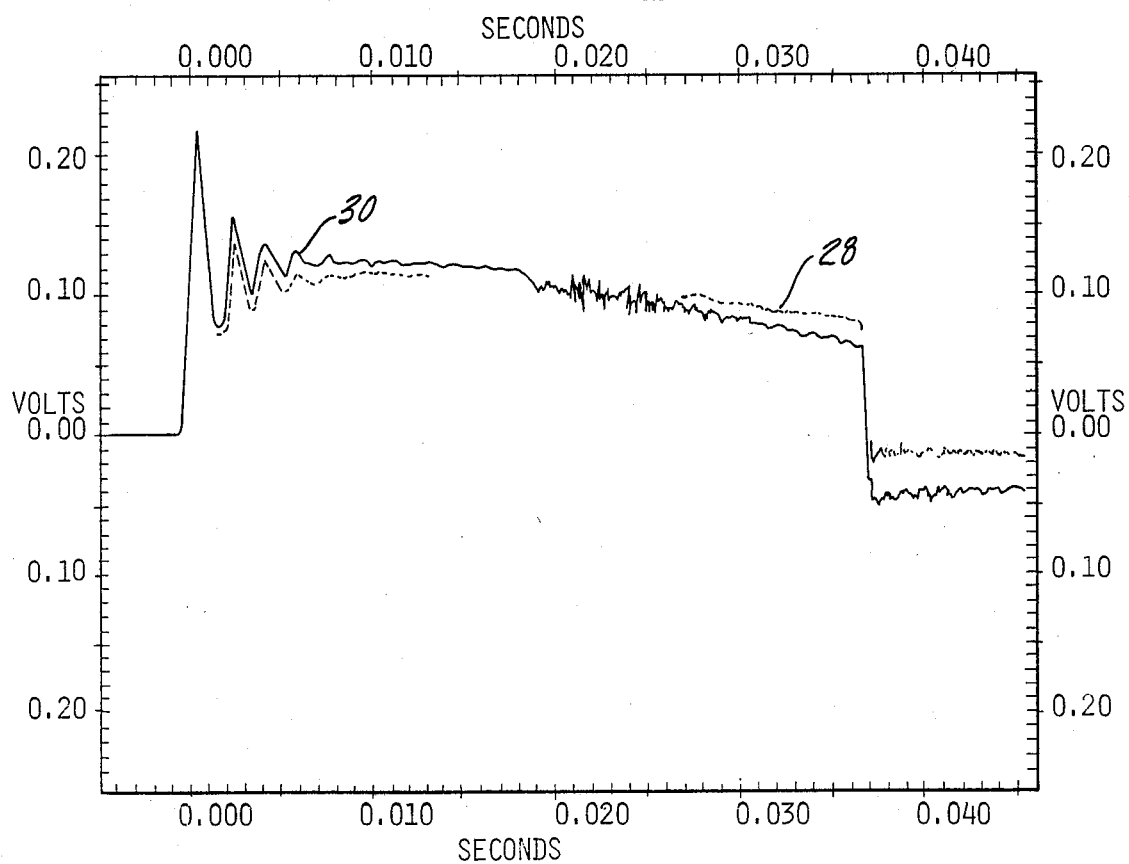
FIG. 2 shows accelerometer response curves.

Referring now to FIG. 2 of the drawings, the effect of placing the triaxial accelerometer 22 (in FIG. 1) within housing 10 (in FIG. 1) may be ascertained. Trace 28 in FIG. 2 shows a time history of the response of an unenclosed accelerometer to a typical acceleration event, lasting less than 40 milliseconds. Trace 30 shows the response of an enclosed accelerometer of the same type to the same acceleration event. Comparison of traces 28 and 30 shows very little discrepancy between their responses, showing that enclosing the accelerometer in the casting resin has only a minor effect on the accelerometer's response. The unencased accelerometr produces a more variable response than does the accelerometer enclosed in plastic. Therefore, an internally mounted accelerometer can accurately respond to the accelerations experienced by the exterior surfaces of an object having the shape of the enclosure.

Figure 3:
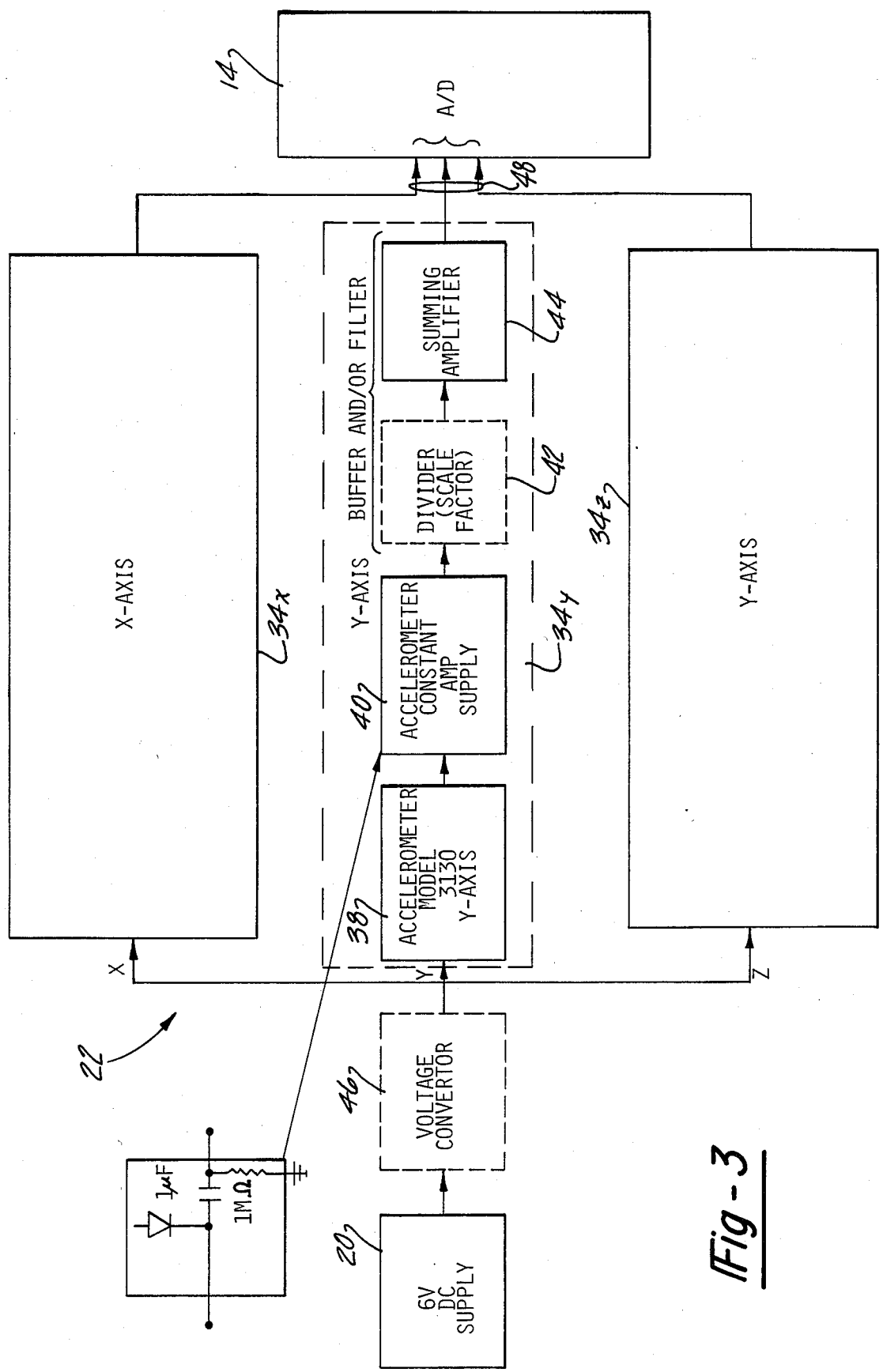
FIG. 3 is a block diagram of an overview of the data acquisition system of the invention.

FIG. 3 shows the portion of the data acquisition system comprising the accelerometers, their voltage supplies, and other associated electronics required to supply the microprocessor 14 (in FIG. 1) with appropriately conditioned accelerometer signals. A 6-volt dc voltage supply 20, such as a pair of 3-volt lithium batteries available from the Altus Company, supplies the current necessary for the electronic circuitry of the apparatus of the invention. In this application, battery life can exceed 48 hours. This voltage supply, following an optional voltage conversion to be described later, is attached to each of the three accelerometers and associated electronics. Each of the accelerometers, 34x, 34y, and 34z supplying the x-, y-, and z-axis acceleration signals, respectively, produces analog voltages which are accepted by an analog-to-digital (A/D) converter port on the microprocessor 14. An Intel model 8097 microprocessor, as part of an Intel 8096 microcontroller family, can serve as microprocessor 14.

Each accelerometer 34 x-z, in the triaxial accelerometer 22, is able to sense accelerations within a range of about plus or minus 750 times g, the acceleration of gravity. The output characteristics of this Vibrametrics model 3130 triaxial accelerometer are very stable. Its linearity is retained even when it is tested with sinusoidal shock levels as high as plus or minus 100 g. Such accelerometers consume very little power—for example, when operated at 6 volts dc, model 3130 accelerometer consumes 0.2 mA. This accelerometer with offset conditioning produces a voltage range of 0 to 5.12 volts for a plus or minus 256 g acceleration range. Increasing the operating voltage range allows the triaxial accelerometer to measure accelerations in excess of the range of plus or minus 750 times g.

While applications where there is interest in sensing accelerations in three orthogonal directions are readily recognized, the number of directions of acceleration sensed and their orientation can be chosen to be suitable for a variety of other applications. Included in these are one- and two-direction measurements as well as non-orthogonal multi-axis sensors.

Accelerometer constant current supply 40 can consist of a current limiting diode with an RC high pass filter circuit having a 3 dB cutoff frequency of 1 Hz. As shown, acceptable values for the resistor and capacitor are: $R=1M\ \Omega$, and $C=1\ \mu F$.

The A/D input of the Intel 8097 microprocessor 14 is designed to receive voltage levels between 0 and +5.5 volts. Because the voltage signals produced by each axis 34x-z of the triaxial accelerometer 22 are sent to A/D converter port 48, the scale factor provided by divider 42 and the offset voltage provided by summing amplifier 44 are chosen to permit the full range of these signals to fall within appropriate voltage ranges.

For example, the accelerations to agricultural products should not exceed plus or minus 250 g, since it has been determined that damage to fruits definitely results at acceleration levels above 200 g and thus equipment is designed to prevent such accelerations. Therefore the accelerometer voltage signal magnitudes can be sent directly to the A/D (after correct offset voltage conditioning) without the need for voltage scaling. For higher g levels (for example up to 500 g for computers and electronic instruments) it is necessary to scale the output accelerometer voltage signals before they are input to port 48.

For an acceleration range of up to plus or minus 256 g, the A/D conversion is simple and direct, requiring only a summing amplifier (offset voltage). The A/D quantization error for this application is plus or minus $\frac{1}{2}$ bit, corresponding to plus or minus 2 g. Only 8 bits of the 10-bit A/D capability of the 8097 microcomputer 14 are used. For an acceleration range of plus or minus 768 g (measured by a Vibrometrics model 3132 accelerometer), or plus or minus 7.68 V output, the A/D input must be scaled down by a factor of 3 in order to obtain a 0 to 5 volt range.

Other triaxial accelerometers 22 may require supply voltage ranges other than 0 to 6 volts. For example, a Vibrometrics model 3132 accelometer operates on a voltage range of 0 to 15 volts. To obtain this range from a single 6-volt battery, a voltage converter 46 is required. Such converters are widely available, having efficiencies as high as 98%.

The 8097 microprocessor 14 can accept signals on as many as 8 channels and is equipped with eight kilobytes (8K) of electrically programmable read-only memory (EPROM, containing the monitor program) and addresses 1M bytes of RAM (for data storage). For the present application, four channels are used with 112k bytes of RAM. The EPROM can consist of two additional Intel 2716 chips and the RAM can consist of RCA 6164 chips. Other equivalent microprocessors and chips can be used.

Figure 4:
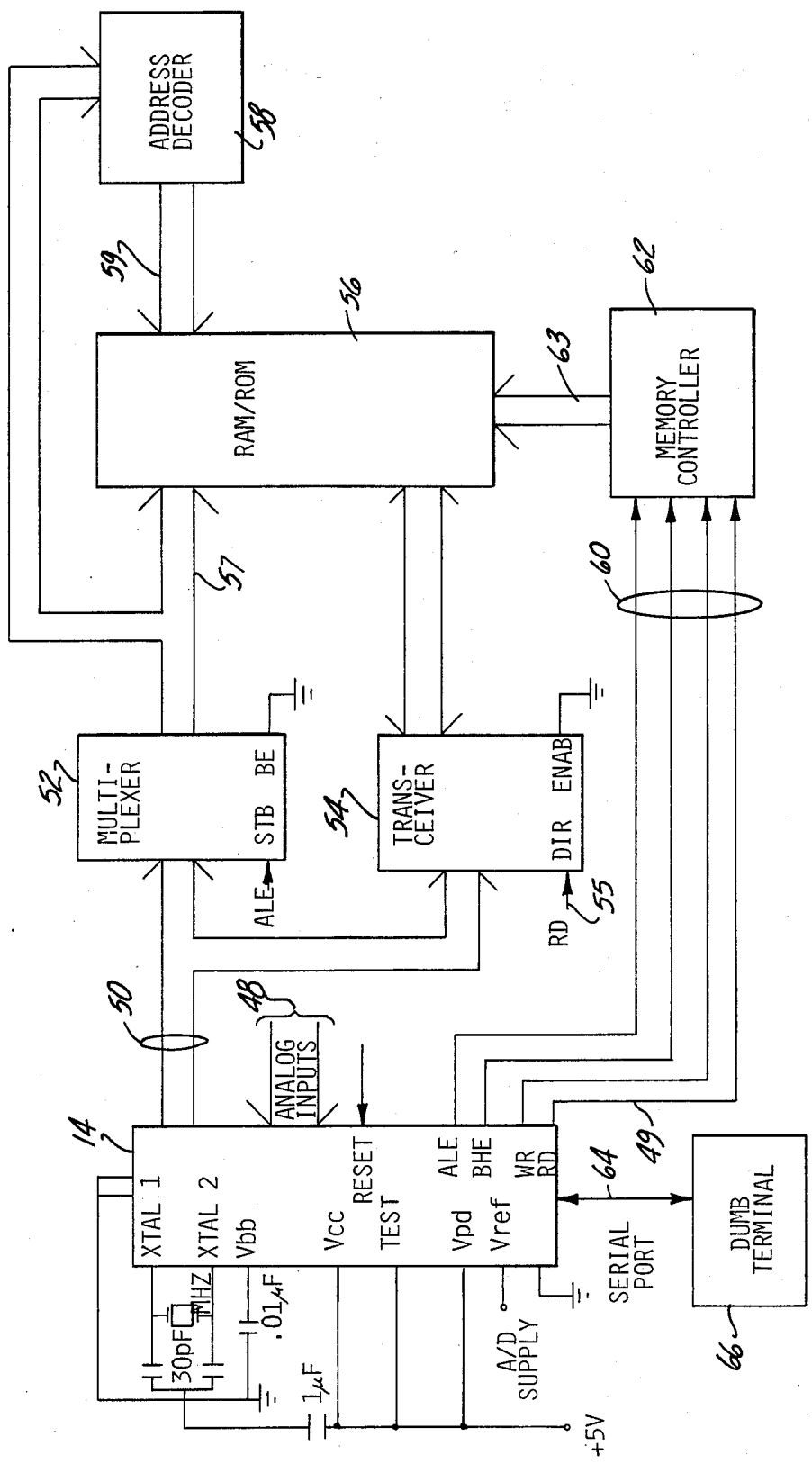
FIG. 4 is a block diagram of microprocessor and memory components of the apparatus of the invention.
Figure 4A:
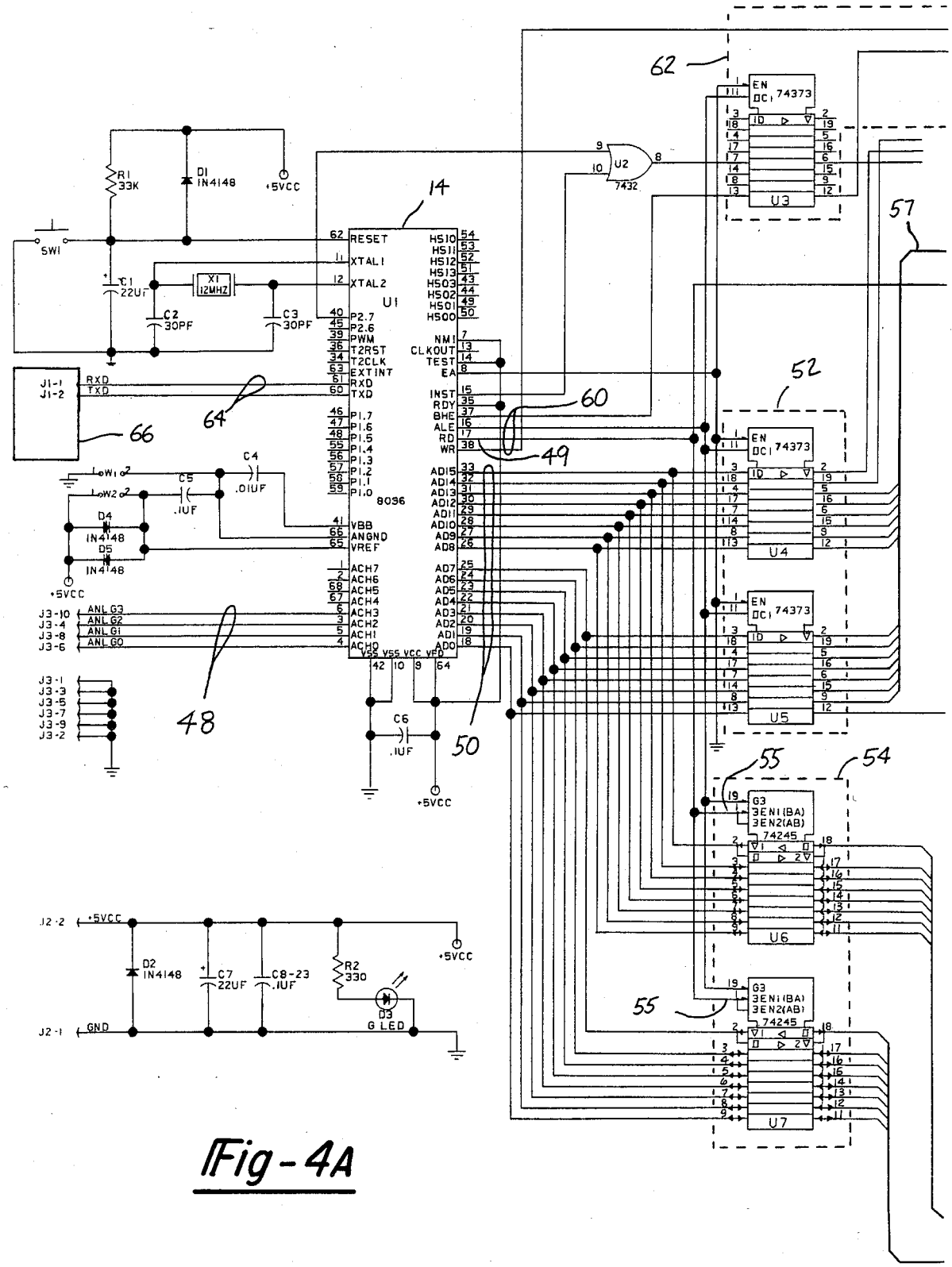
FIGS. 4A and 4B taken together are a detailed schematic diagram of microprocessor and memory components of the apparatus of the invention shown in the block diagram of FIG. 4.
Figure 4B:
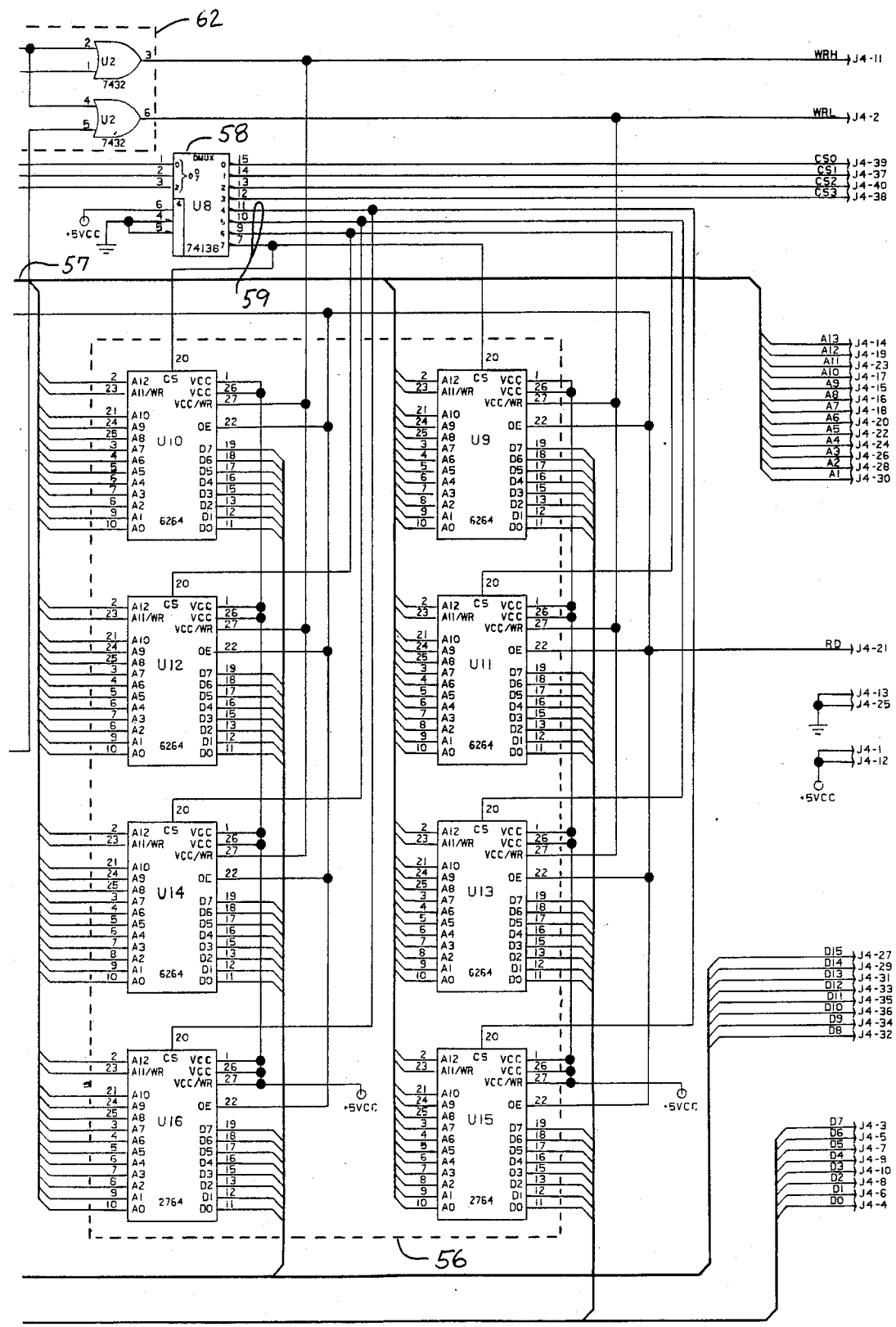

As shown in FIG. 4 and FIGS. 4A and 4B of the drawings, Intel 8097 microprocessor 14 receives analog inputs through its A/D channel inputs 48. Sampling each of three axes of triaxial accelerometer 22 every 1 millisecond, microprocessor 14 produces 10 parallel lines of digital data, of which 8 are utilized. The alternately sampled 8 bits from the triaxial accelerometer are input along with the appropriate sixteen bit address into the memory 56. These digital outputs are produced at port 50, with the digitized data representing cyclically produced samples of each of the three acceleration components measured by triaxial accelerometer 22. Of course, microprocessor 14 can be programmed to sample only two of the accelerometers in applications where it is known that accelerations do not occur in the third direction. The data are sent to both multiplexer 52, consisting of two Intel 8282 integrated circuits, and transceiver 54, consisting of two 74LS245 non-inverting octal transceiver circuits. Both multiplexer 52 and transceiver 54 are connected to memory 56.

Multiplexer 52 produces the memory address at which the corresponding digital data are to be stored. These addresses are sent to memory 56 and to address decoder 58 which determines which of the six RCA 6164 RAM chips to enable for storage of the digital data. Thus, a RAM chip enable signal is provided to memory 56 over parallel line 59 and the specific address on the enabled chip is provided by multiplexer 52 over parallel line 57.

Transceiver 54, upon receipt of the appropriate signal on its direction ("DIR") pin 55 from the "RD" pin 49 of microprocessor 14, receives a digitized sample from port 50 and transmits this digital data to memory 56, where it is stored. At other times, transceiver 54 can receive data stored in memory 56 and transmit it to microprocessor 14. Transceiver 52 is used in this mode, for example, at the time of system startup, to load the monitor program stored in the ROM portion of memory 56 into microprocessor 14.

Microprocessor 14 also produces control signals, which are sent over line 60 to memory controller 62. Memory controller 62 converts these signals to memory control signals. The memory control signals are transmitted to memory 56 over parallel lines 63 to control the timing of the data storage and retrieval operations.

Finally, microprocessor 14 has a serial port 64 which can produce asynchronous serial signals to allow transmittal of data to and from an attachable dumb terminal 66. Dumb terminal 66, which can, for example, be attached to port 64 by means such as signal line 24 and electronic jack 26 of FIG. 1, can be used to program microprocessor 14 in the future. It can also receive data stored in memory 56 through transceiver 54 under the control of microprocessor 14.

The storage of digitized data memory 56 is in the form of a packed record file. This file is made up of a header and a record for each impact event which is above the set threshold. The header contains the following information; the time and date of file creation, the zero g digitized value, sampling rate, and the threshold setting. Each record will consist of a start time variable (4 bytes), number of data points per axis variable (2 bytes), and a dynamic number of three-byte-long arrays which represent the accelerations of each axis. The number of three-bytes arrays equals the number of data points per axis variable. The 16-bit beginning and end of file addresses will be stored elsewhere in memory along with a current position index. Software provisions have been made to accommodate having more than one file on-board memory, along with different internal file structures.

During serial file transfers the 8-bit bytes will be converted to hex notation, so that ASCII standards can be used in data transfer.

Figure 5:
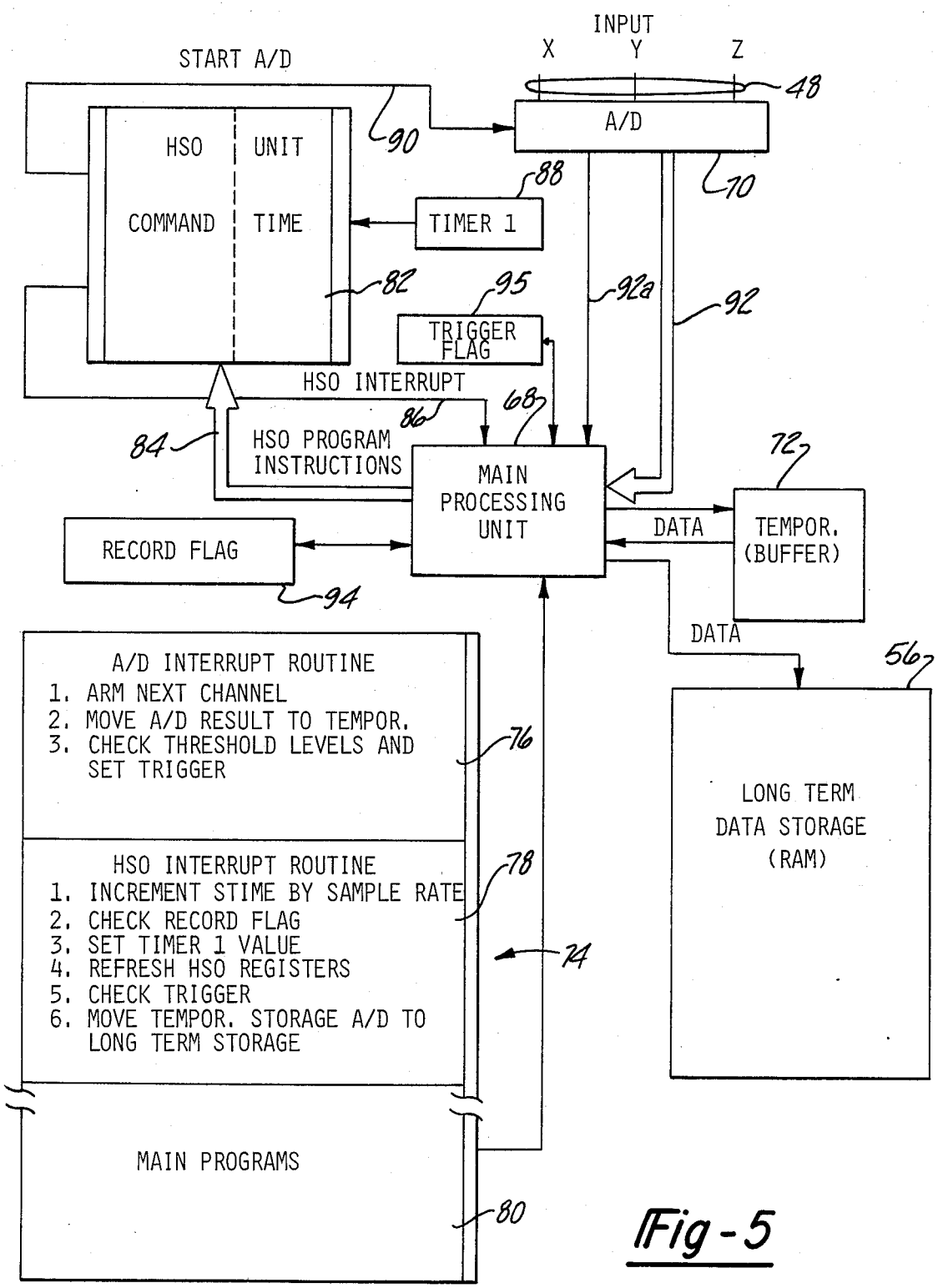
FIG. 5 is a schematic diagram showing the relationships between the hardware and software of the apparatus of the invention.

Referring to FIG. 5 of the drawings the architecture of microprocessor 14 can be better understood. Microprocessor 14 comprises a main processing unit 68 which receives data from A/D converter 70 which, in turn digitizes analog signals received from the accelerometers at port 48 of the microprocessor. In addition, main processing unit 68 can access both temporary storage 72 (in the form of a buffer) for temporary storage of data and the RAM portion of memory 56. Trigger flag 95 is set by main processing unit 68 when the digital data produced by A/D converter 70 satisfy certain criteria which signify that a recordable acceleration event has occurred. These criteria will be discussed subsequently.

Finally, main processing unit 68 is attached to the nearly autonomous high speed output (HSO) unit 82. Monitor program 74, which is used by main processing unit 68, comprises an A/D interrupt routine 76, HSO interrupt routine 78, and other programs 80, which are read from the EPROM portion of memory 56. The programs used in this embodiment are included in the microfiche appendix.

HSO unit 81 receives program instructions from main processing unit 68 over HSO program instruction line 84. In turn, HSO unit 82 is capable of sending an interrupt signal to main processing unit 68 over interrupt line 86. HSO unit 82 also receives a timer signal from timer 88 and can send a "start A/D" signal to A/D converter 70 over signal line 90.

HSO unit 82 has eight program registers which hold both commands and associated commencement times. All eight programmed times are compared to the reference timer 88 at every cycle of the microcomputer system's clock. The HSO unit is programmed when main processing unit 68 sends portions of monitor program 74 over HSO program instruction line 84. A first portion of monitor program 74, A/D interrupt routine 76, is executed when there is an A/D interrupt with the resulting A/D data placed into temporary storage for threshold comparison and preparation for next channel conversion.

Data produced by A/D converter 70 will not be recorded unless trigger flag 95 is set. This signal will be set if any one of the three axes of triaxial accelerometer experiences an acceleration outside of a band of accelerations centered about 0 g. This is accomplished by comparing the absolute value of the digital value of each sample produced by A/D converter to a predetermined threshold value. If main processing unit 68 determines that the absolute value of the acceleration along any one of the three axes has exceeded a predetermined threshold, the trigger flag 95 is set. If the threshold is not exceeded, the value of the trigger flag 95 is reset.

Figure 6A:
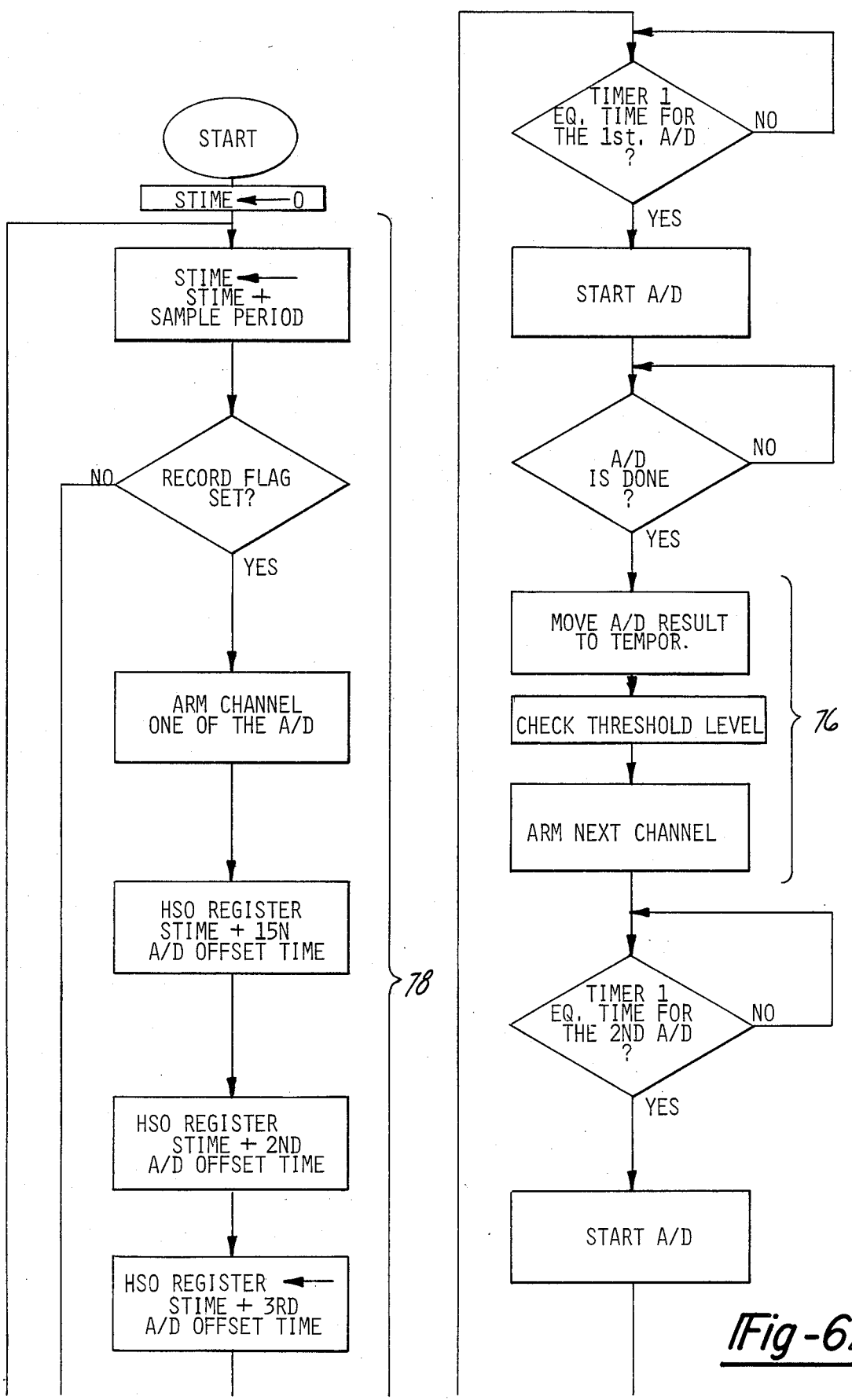
FIGS. 6A and 6B taken together are a flowchart of the sampling routines implemented by the microprocessor of the invention.
Figure 6B:
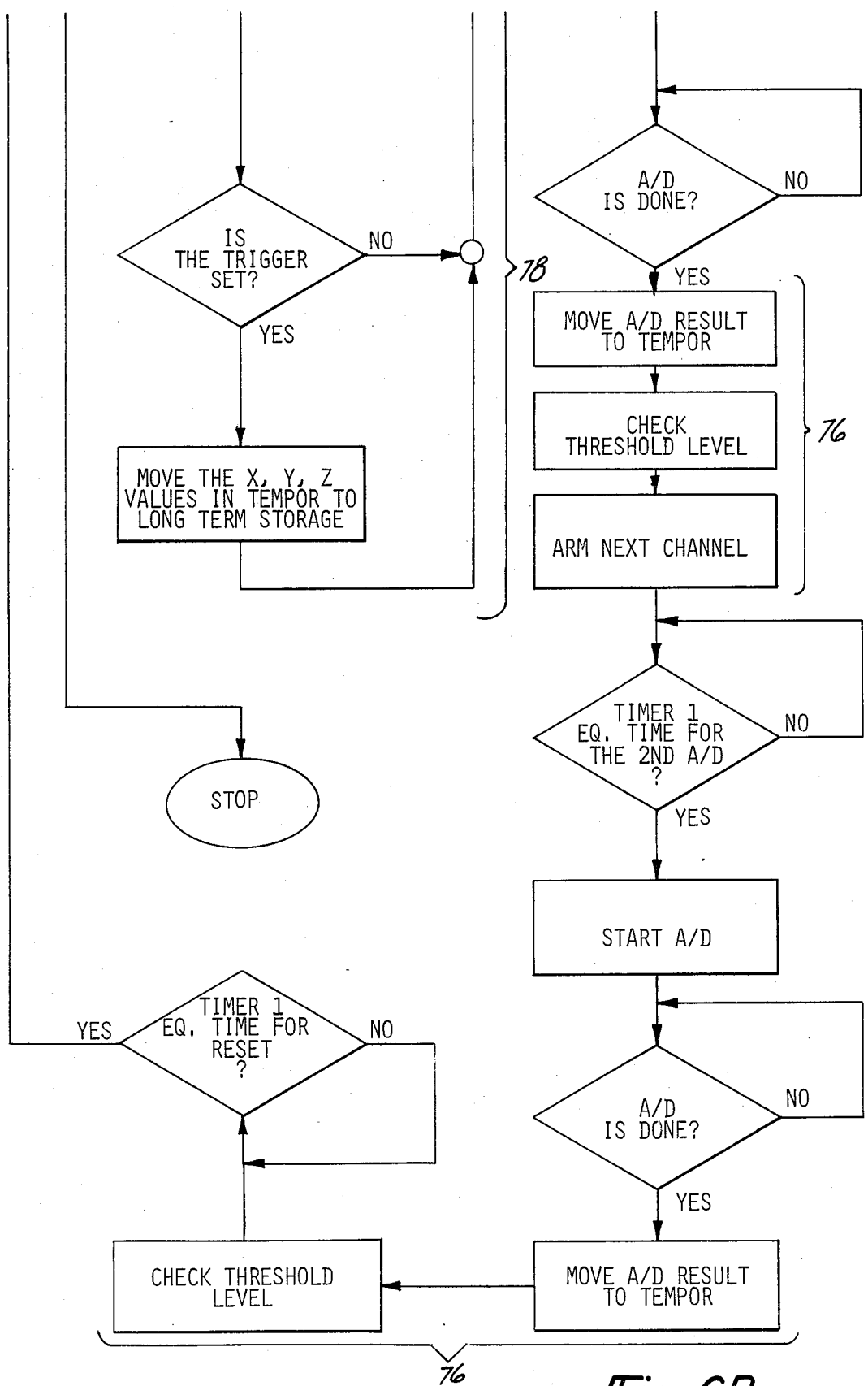

A flow chart describing the sampling operation of the system is shown in FIGS. 6A and 6B. The first step in routine 78 is to increment the variable STIME by the sample period. Next, a command in HSO interrupt routine 78 checks to determine whether the record flag 94 (see FIG. 5) is set. If record flag is not set, routine 78 is stopped and the main programs 80 resumes control. If the record flag is set, preparations are made to arm channel 1 (which receives the analog input from the x axis of accelerometer 22 in FIG. 1) of A/D unit 70. Next, appropriate offset times are added to the saved value of timer 1, producing the three sample times at which the three analog input signals will be converted by A/D unit 70. Finally, any x, y, and z values in temporary storage 72 (FIG. 5) are caused to be moved to long term data storage 56. Until another interrupt 76 or 78 takes place, the main programs 80 retain control.

HSO unit 82 now waits for the value of timer 88 to be equal to the time for the first A/D conversion. This conversion is performed and the result stored in temporary storage 72. Similarly, samples of the analog voltages produced by the other two axes of the accelerometer are sampled and stored in temporary storage 72. The A/D unit 70 sends an interrupt signal over interrupt line 92a which prepares the main processing unit 68 to receive data. This causes the interrupt routine 78 to be executed. The data is transferred to temporary buffer 72 by eight bit bus 92. The hardware is contained in the Intel 8097.

HSO unit instructions are deleted from the HSO program registers after execution; therefore the HSO program registers must be reset after each sample period. The sampling process is made self-perpetuating by having the HSO interrupt routine 78 reprogram HSO unit 82 after each sample period.

The A/D interrupt routine is performed in five timer increments; a single A/D conversion is performed in twenty-one timer increments. Therefore, because a timer increment equals two microseconds, the time to sample the signals produced by all three axes of triaxial accelerometer 22 is 156 microseconds (=3 times 26 timer increments, at 2 microseconds per timer increment). A substantial time delay is added before sampling the first axis, in order to decrease the overall effective sampling rate accomplished by A/D converter 70. Therefore, the three acceleration channels are sampled nearly simultaneously, minimizing the effects of time delay. At these rates, a 50 ms event can be sampled 320 times, thus minimizing effects of aliasing, and producing three bytes of data per sample (one byte per accelerometer channel with each sample). These 960 bytes, plus the 4 required to store the relevant time data and the two for the number of samples included, mean that each event takes 966 bytes of storage. Thus, a total of 116 (=112k bytes/966 bytes) events can be stored in RAM.

Except during the execution of the HSO interrupt routine 78 and the A/D interrupt routine 76, main processor unit 68 is free to handle mass data moves in raw data processing, as well as limited data analysis. Approximately 500 instructions can be executed between accelerometer samples when sampling at 1000 Hz. Frequency contents and/or frequency of occurrence of accelerations exceeding a predetermined level can be measured by such sequences of instructions.

The serial port, beside its uses as a means for reading data stored in the microcomputer RAM and reprogramming microprocessor 14, can serve to change the thresholds which initiate data storage. It can also serve as an additional path for digital data to be stored in RAM. An example of an external source of data which should be recorded is an accelerometer mounted on the bed of a trunk which is carrying the items which are being monitored. This capability will allow correlation studies to be made of the external shocks imposed on the shipping means and the resultant shocks experienced by the individual items. Microprocessor 14 can be programmed to initiate recording based on the magnitude of these external shocks.

Various power supplies can be used, also. For example, by providing a lead from the electronic package 12 to the exterior of housing 10 (in FIG. 1), battery 20 may be rechargeable, allowing its use over much more extended periods of time and obviating the need to change batteries so frequently. In addition, an external power supply can be used when the apparatus is in use, if such supply is available. Finally, to protect from the undesirable loss of data due to a failure of battery 20, RAM 18 can be connected to its own dedicated battery.

While the preferred embodiment described above is related to the use of the measurement of accelerations experienced by subject objects as fruits, the subject of this application should not be so limited. The apparatus of this invention can find great utility in shipping applications, such as the shipping or fragile electronic equipment, in that it will provide a means for determining when the greatest shocks occur in the shipment of such equipment.

Further, while the preferred embodiment includes conventional accelerometer means for measuring accelerations, other accelerometer means can also be used. Examples are sensors which measure accelerations by sensing the heat produced or which measure damaging forces by sensing pressures. In addition, sensors measuring other physical quantities, such as temperature, humidity, pressure, and radiation, regardless of their principles of operation, can be used in connection with the apparatus described above. Also, various sensors can be used in combination with the apparatus of the preferred embodiment to sense several quantities concurrently.

While the preferred embodiment has been described in terms of a specific microprocessor and data acquisition system, other commercially available systems with different architectures can be equivalently used. The communications port, described as a serial port communicating data in compliance with the RS 232 timing, could be a parallel communication port in some specific applications. Therefore, the scope of this invention is to be limited only by the following claims.

| INDEX TO THE MICROFICHE APPENDIX | |
|---|---|
| Name of Program | Description of Program |
| 1. BOOT V1.2 | Initializes the 8097 micro-controller. |
| 2. PHOTOTYPE-MAIN | Main control loop. |
| 3. S_PORT V2.0 | Serial port interrupt routine. |
| 4. DISPLAY MODULE V1.2 | Display memory and converts binary to hex. |
| 5. R_DATA V1.2 | Commences data collection. |

| -continued | |
|---|---|
| INDEX TO THE MICROFICHE APPENDIX | |
| Name of Program | Description of Program |
| 6. HSOINT V2.0 | HSO interrupt routine. |
| 7. CLOCK V1.0 | Timer overflow interrupts routine. |
| 8. AD_INT V1.0 | Moves A/D result to temporary memory storage. |
| 9. M_MANG V1.0 | Manages data memory. |

We claim:
1. The method of sensing physical variables affecting an item while it is subjected to handling operations such as packaging and shipping, and recording a portion of the time history of those sensed physical variables which meet predetermined criteria, comprising the steps of:
(A) attaching to the item a housing containing transducer means for sensing the physical variables, clock means, memory means, communication means, microprocessor means, and power supply means, operable to sense and quantify the values of the physical variables and to record the quantified sensed physical variables and their times of occurrence in the memory means under the control of a program comprising instructions to the microprocessor means, the housing being attached in a manner so that the values of the physical variables sensed by the transducer means are substantially similar to the values of the physical variables affecting the item;
(B) causing the item to be sujected to the handling operations so that the housing is subjected to the same physical variables as the item;
(C) sensing the physical variables experienced by the housing;
(D) storing intervals of the time history of the values of those sensed physical variables which meet predetermined criteria in the memory means, the intervals being of predetermined duration and beginning with the values of those sensed physical variables which first meet the predetermined criterion in each interval; and
(E) reading the stored values of the physical variables from the memory means to a device external to the housing, whereby the magnitude of, and the time and frequency content of the occurrence of the sensed physical variables, experienced while the item is being handled, can be determined after the handling operations are performed on the item.

2. An acceleration event detector/recorder that can be contained within a housing, comprising:
transducer means for sensing accelerations along at least one axis, and for producing digital signals quantifying the sensed physical quantities;
clock means for producing a digital timer signal;
memory means for storing program instructions and for storing data representing digital signals;
communication means for communicating digital information with a separate device; and
microprocessor means connected to the transducer means, the clock means, the memory means, and the communication means, and being adapted to read and execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the accelerations satisfies a predetermined criterion and for controlling the communication means to communicate digital information with the separate device.

3. The acceleration event detector/recorder of claim 2, wherein the transducer means senses accelerations along three separate axes.

4. The acceleration event detector/recorder of claim 2 wherein the transducer means comprises three accelerometer means adapted to produce analog signals corresponding to the accelerations along each of three axes and conversion means for producing digital signals representing the analog signals produced by each of the three accelerometer means; and the microprocessor means comprises arithmetic logic means adapted to receive the three digital signals quantifying the accelerations along each of the three axes, for processing the digital signals.

5. The acceleration event detector/recorder of claim 4, wherein the arithmetic logic means processes the digital signals to produce a digital signal representing the resultant acceleration.

6. The acceleration event detector/recorder of claim 4, wherein the arithmetic logic means processes the digital signals to produce a digital signal representing the area under the acceleration time-history curve.

7. The acceleration event detector/recorder of claim 4 wherein the arithmetic logic means processes the digital signals to produce digital signals representing the time of occurrence of an acceleration event.

8. The acceleration event detector/recorder of claim 4 wherein the arithmetic logic means processes the digital signals to produce digital signals representing the frequency contents of accelerations which meet predetermined criteria.

9. The acceleration event detector/recorder of claim 4, wherein each of the three accelerometer means comprises a piezoelectric accelerometer for measuring time varying signals.

10. The acceleration event detector/recorder of claim 2 wherein the microprocessor means controls the storage of data representing digital signals quantifying the accelerations in each channel whose magnitudes satisfy the predetermined criteria.

11. The acceleration event detector/recorder of claim 8 wherein the predetermined criterion is that the magnitude in at least one of the channels exceeds a predetermined level.

12. The acceleration event detector/recorder of claim 2 wherein the memory means comprises a first memory means for storing program instructions and a second memory means for receiving, from the microprocessor means, the digital signals produced by the transducer means and the timer means, and for storing data representing the received digital signals.

13. The acceleration event detector/recorder of claim 2, wherein the first memory means is a read-only memory.

14. The acceleration event detector/recorder of claim 2 wherein the communication means can be used to cause program instructions received from a separate device to be stored in the memory means.

15. An acceleration event detector/recorder that can be contained within a housing, comprising:

three accelerometer means for sensing accelerations in three orthogonal directions and producing analog signals correspnding to the accelerations in each of the three directions;

clock means for producing a digital timer signal;

read-only memory means for storing program instructions;

digital memory means adapted to receive digital signals and store data representing the digital signals; and microprocessor means, including analog-to-digital converter means for producing digital signals representing the analog signals produced by each of the three accelerometer means, arithmetic logic means adapted to receive, from the analog-to-digital converter means, the digital signals quantifying the acceleration in each of the three orthogonal directions, for processing the digital signals, and communication means for communicating digital information with an external device, the microprocessor being connected to the clock means, the read-only memory means, and the digital memory means and adapted to read the program instructions from the read-only memory means, for causing the data representing both the digital signals produced by the transducer means during an interval of time of predetermined duration and the digital timer signal produced by the clock means at the beginning of the interval of time to be stored in the memory means, the interval of time beginning when at least one of the accelerations satisfies a predetermined criterion, for controlling the reading of the stored data in the digital memory means, and for communicating the data stored in the digital memory means with the external device.

16. The acceleration event detector/recorder of claim 15, wherein the communication means is an asynchronous serial communication means.

17. The acceleration event detector/recorder of claim 15, wherein the communication means is adapted to transmit an external serial digital data signal to the microprocessor means for storage in the digital memory means.

18. The acceleration event detector/recorder of claim 15, wherein the read-only memory means is electrically alterable and the micrprocessor means is further adapted to communicate digital program data from the external device for storage in the electrically alterable memory, whereby the microprocessor can be reprogrammed.

19. The acceleration event detector/recorder of claim 15, further comprising a digital memory backup battery adapted to provide electrical power to the digital memory means.

20. The acceleration event detector/recorder of claim 15, wherein the digital memory means comprises a non-volatile memory means.

21. The acceleration event detector/recorder of claim 15 wherein the communication means can be used to cause program instructions received from a separate device to be stored in the memory means.

22. An event detector/recorder that can be contained within a housing, comprising:

transducer means for sensing one or more physical quantities and for producing digital signals quantifying the sensed physical quantities;

clock means for producing a digital timer signal;

memory means for storing program instructions and for storing data representing digital signals;

communication means for communicating digital information with a separate device; and microprocessor means connected to the transducer means, the clock means, the memory means, and the communication means, and being adapted to read and execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the physical quantities satisfies a predetermined criterion and for controlling the communication means to communicate digital information with the separate device.

23. The event detector/recorder of claim 22 wherein the communication means can be used to cause program instructions received from a separate device to be stored in the memory means.

24. The method of force or acceleration events experienced by a damageable item while it is subjected to handling operations such as packaging and shipping, and recording a portion of the time history of those acceleration events which meet predetermined criteria, comprising the steps of:

(A) attaching to the item a housing containing force or acceleration detecting transducer means, clock means, memory means, communication means, microprocessor means, and power supply means, operable to sense and quantify accelerations and to record the quantified accelerations and their times of occurrence in the memory means under the control of a program comprising instructions to the microprocessor means, the housing being attached in a manner preventing any relative motion between the item and the housing;

(B) causing the item to be subjected to the handling operations so that the housing is subjected to the same acceleration events as the item;

(C) sensing the accelerations experienced by the housing;

(D) storing intervals of the time history of the values of those acceleration events which meet predetermined criteria in the memory means, the intervals being of predetermined duration and beginning with the values of those acceleration events which first meet the predetermined criteria in each interval; and (E) reading the stored acceleration time histories from the memory means to a device external to the housing, whereby the magnitude of, and the time and frequency content of severe force or acceleration events, experienced while the damageable item is being handled, can be determined after the handling operations are performed on the damageable item.

25. An acceleration event detector/recorder, comprising:

a housing constructed to approximate an article of commerce, such as a fruit, in size, shape, and mass, so that the acceleration events experienced by the housing can be correlated to those experienced by the article which the housing approximates;

three accelerometer means for sensing accelerations in three orthogonal directions and producing analog signals corresponding to the accelerations in each of the three directions;

clock means for producing a digital timer signal;

read-only memory means for storing program instructions;

digital memory means adapted to receive digital signals and store data representing the digital signals; and microprocessor means, including analog-to-digital converter means for producing digital signals representing the analog signals produced by each of the three accelerometer means, arithmetic logic means adapted to receive, from the analog-to-digital converter means, the digital signals quantifying the acceleration in each of three orthogonal directions, for processing the digital signals, and communication means for communicating digital information with an external device, the microprocessor being connected to the clock means, the read-only memory means, and the digital memory means and adapted to read the program instructions from the read-only memory means, for causing the data representing both the digital signals produced by the transducer means during an interval of time of predetermined duration and the digital timer signal produced by the clock means at the beginning of the interval of time to be stored in the memory means, the interval of time beginning when at least one of the accelerations satisfies a predetermined criterion, for controlling the reading of the stored data in the digital memory means, and for communicating the data stored in the digital memory means with the external device.

26. The acceleration event detector/recorder of claim 25, wherein the housing is made from a casting resin.

27. The acceleration event detector/recorder of claim 25, wherein the housing is constructed to approximate an article of commerce, such as a fruit, and wherein the transducer means is surrounded by a casting resin enclosure, the enclosure being disposed within the housing so that the three accelerometer means experience accelerations substantially similar to those as would be experienced by the article of commerce.

* * * * *

REEXAMINATION CERTIFICATE (3130th)
United States Patent [19]
Tennes et al.

[11] B1 4,745,564
[45] Certificate Issued  Feb. 11, 1997

[54] IMPACT DETECTION APPARATUS

[75] Inventors: Bernard R. Tennes, Charlotte; Galen K. Brown, Okemos; Joseph R. Clemens; Henry A. Affeldt, both of East Lansing, all of Mich.; Siamak Siyami, Tehran, Islamic Rep. of Iran; Brian A. Klug, Buchanan; Hans R. Zapp, Okemos, both of Mich.

[73] Assignee: The United States of America as represented by the Secretary of Agriculture, Washington, D.C.

Reexamination Request:
No. 90/003,588, Sep. 26, 1994

Reexamination Certificate for:
Patent No.: 4,745,564
Issued: May 17, 1988
Appl. No.: 827,142
Filed: Feb. 7, 1986

[51] Int. Cl.[6] .......................... G01P 15/04; G01D 1/14; G06F 17/40; G06F 19/00
[52] U.S. Cl. .................. 364/566; 364/550; 73/489; 346/33 D; 346/33 R; 374/102; 374/170
[58] Field of Search ...................... 364/566, 550, 364/551.01, 920, 221.7, 223.1; 346/33 D, 33 R; 73/489, 503; 360/5

[56] References Cited

U.S. PATENT DOCUMENTS

| | | | |
|---|---|---|---|
| 2,922,990 | 1/1960 | Anderson | 364/920 |
| 3,059,235 | 10/1962 | Sammis et al. | 360/5 |
| 3,225,333 | 12/1965 | Vinal | 364/920 |
| 3,284,708 | 11/1966 | Morris et al. | 73/503 |
| 3,344,406 | 9/1967 | Vinal | 364/920 |
| 3,366,933 | 1/1968 | Carp et al. | 364/920 |
| 3,599,222 | 8/1971 | Franklin et al. | 360/5 |
| 3,877,296 | 4/1975 | Rihn . | |
| 4,114,450 | 9/1978 | Schulman et al. | 364/566 |
| 4,227,198 | 10/1980 | Preskitt et al. . | |
| 4,387,587 | 6/1983 | Faulconer . | |
| 4,616,320 | 10/1986 | Kerr et al. . | |
| 4,638,289 | 1/1987 | Zottnik . | |

OTHER PUBLICATIONS

J. Bendat & A. Piersol, "Random Data; Analysis and Measurement Procedures," pp. 228–231 (Sussex, UK, Wiley 1971).
"The A-700 Accelocorder" Teledyne Geotech.
"S-6 Peak Vibration Monitor model 53136", Sinco Slope Indicator Company.
"Impact recorders—They're reaching new levels of sophistication", *Handling & Shipping*, Industrial Publishing Co., May 1968.
Scholer Bangs, "The newest generation; it could be christened 'Sherlock'", *Handling & Shipping*, Industrial Publishing Co., May 1968.
J. A. Poulalion, "The recording and presentation of transportation environmental data", presented at the Third Symposium of the Socity of Environmental Engineers, Imperial College of Science and Technology, London, Apr. 15–18, 1969.
"TEMARS Transportation Environment Measurement and Recording System", Endevco Corporation, 1967.
"TEMARS", Endevco, 1970.
"Installation and Maintenance Manual Model A700 Accelocorder", Teledyne Geotech, Jun. 6, 1984.

(List continued on next page.)

*Primary Examiner*—Ellis B. Ramirez

[57] ABSTRACT

An apparatus for measuring and recording accelerations or other physical quantities experienced by easily damaged items of commerce such as fruit and electronic computers. A triaxial accelerometer or other suitable sensor produces signals which are sampled by a microprocessor operating according to a program stored in a read-only memory. When the sampled accelerations or other physical quantities exceed a predetermined threshold, samples are stored in a random access memory, along with their times of occurrence. The apparatus provides a serial port for reading out the recorded acceleration data. The data may then be subjected to further processing externally.

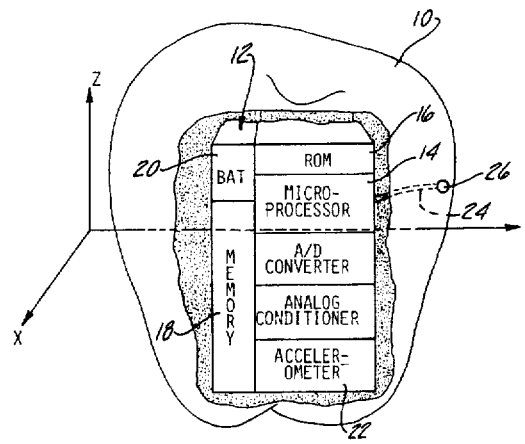

OTHER PUBLICATIONS

"Instantel DS-377 Digital Seismograph", Instantel Inc.

"Digital Cassette Accelerograph Model DCA-333", Terra Technology Corp., 1988.

"Digital Accelerograph: Model DCA-333 with RAMDECK Solid State Memory", Terra Technology Corp.

James N. Brune et al, "Digital Seismic Event Recorders: Description and Examples from the San Jacinto Fault, the Imperial Fault, the Cerro Prieto Fault and the Oaxaca, Mexico Subduction Fault".

"Digital Cassette Accelerograph Model DCA-300P", Terra Technology Corp.

"Digital Cassette Accelerograph Model DCA-310", Terra Technology Corp.

"Safeguard Seismic Unit 1000D", Philip R. Berger & Associates, Inc.

"DCA-310 Digital Cassette Accelerograph Doc 95-320143 Rev A", Terra Technology Corp., 1981.

"Model GSR-12 Strong Motion Recorder", Terra Technology Corp.

"Tele-Blast", Digital Vibration, Inc. 1985.

"Nomis Log I Digital Seismograph", Nomis Computer Systems Corporation.

"DSA-3 Central Recording Digital Accelerograph", Kinemetrics Inc., Jan. 1985.

"Operating Instructions for DSA-3 Strong Motion Accelerograph System (Digital Recording)", Kinemetrics, Inc., Mar. 1984.

"DSA-1 Strong Motion Accelerograph", Kinemetrics, Inc., 1985.

"Operating Instructions for the PDR-2 Compuseis ++", Kinemetrics, Inc., Jun. 1982.

G. Latham, "The Texas Ocean-Bottom Seismograph", Offshore Technology Conference, 1978.

"Operation and Maintenance Manual Microcorder, Model MCR-600", Teledyne Geotech, Jan. 10, 1980.

"Model ST-4D Seismic/Acoustic Triggered Seismograph", Dallas Instruments, Inc., Jan. 1985.

Paul J. Mattaboni and Sean C. Solomon, "Mitobs: A Seismometer System for Ocean-Bottom Earthquake Studies", D. Reidel Publishing Company, 1977.

William A. Prothero, Jr., "A Digital Event-Recording Ocean Bottom Seismometer Capsule", D. Reidel Publishing Company, 1977.

W. M. Adams, "A Triggering Digital Seismograph Utilizing Microprocessor with Memory For Preserving First-Motion Information", Jun. 1976.

E. W. Reece and D. E. Ryerson, "The Development and Demonstration of a Strong Motion Seafloor Earthquake Measurement System", Offshore Technology Conference, 1979.

Steinmetz, Donoho, Murff, and Latham, "Soil Coupling of a Strong Motion, Ocean Bottom Seismometer", Offshore Technology Conference, 1979.

"Instruction Manual Bump Recorder Type 2503", Bruel & Kjaer, Jun. 1978.

"Vibration Meters, Monitors and Filters", pp. 317-322, Bates Nos. 5740-5745.

"SD340 FFT Signal Analyzer", Scientific Atlanta Spectral Dynamics Division, Oct. 1981.

"SD340—the 'go-anywhere' vibration and noise analyzer", Spectral Dynamics, Sound and Vibration, Apr. 1978.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 10–16:

This invention relates to the measurement of accelerations experienced by items undergoing various handling operations and, more particularly, to an apparatus which can be fixedly attached to an item or placed among items to record all triaxial [accelerations] *acceleration* events which exceed a predetermined threshold and the times of occurrence of those acceleration events.

Column 7, lines 45–51:

HSO unit [81] *82* receives program instructions from main processing unit 68 over HSO program instructions line 84. In turn, HSO unit 82 is capable of sending an interrupt signal to main processing unit 68 over interrupt line 86. HSO unit 82 also receives a timer signal from timer 88 and can send a "start A/D" signal to A/D convertor 70 over signal line 90.

Column 8, lines 25–36:

HSO unit 82 now waits for the value of timer 88 to be equal to the time for the first A/D conversion. This conversion is performed and the result stored in temporary storage 72. Similarly, samples of the analog voltages produced by the other two axes of the accelerometer are sampled and stored in temporary storage 72. The A/D unit 70 sends an interrupt signal over interrupt line 92a which prepares the main processing unit 68 to receive data. This causes the interrupt routine [78] *76* to be executed. The data is transferred to temporary buffer 72 by eight bit bus 92. The hardware is contained in the Intel 8097.

Column 9, lines 4–17:

The serial port, beside its uses as means for reading data stored in the microcomputer RAM and reprogramming microprocessor 14, can serve to change the thresholds which initiate data storage. It can also serve as an additional path for digital data to be stored in RAM. An example of an external source of data which should be recorded is an accelerometer mounted on the bed of a [trunk] *truck* which is carrying the items which are being monitored. This capability will allow correlation studies to be made of the external shocks imposed on the shipping means and the resultant shocks experienced by the individual items. Microprocessor 14 can be programmed to initiate recording based on the magnitude of these external shocks.

AS A RESULT OF REEXAMINATION, IT HAS BEEN DETERMINED THAT:

The patentability of claims 1 and 24 is confirmed.

Claims 2, 15, 22 and 25 are determined to be patentable as amended.

Claims 3–14, 16–21, 23, and 26–27, dependent on an amended claim, are determined to be patentable.

New claims 28–59 are added and determined to be patentable.

2. An acceleration event detector/recorder that can be contained within a housing *for detecting and recording acceleration events corresponding to those experienced by a transported article*, comprising:

transducer means for sensing accelerations along at least one axis *corresponding to accelerations experienced by a transported article*, and for producing digital signals quantifying the sensed physical quantities;

clock means for producing a digital timer signal;

memory means for storing program instructions and for storing data representing digital signals;

communication means for communicating digital information with a separate device; and microprocessor means connected to the transducer means, the clock means, the memory means, and the communication means, and being adapted to read and execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the accelerations satisfies a predetermined criterion and for controlling the communication means to communicate digital information with the separate device.

15. An acceleration event detector/recorder that can be contained within a housing *for detecting and recording acceleration events corresponding to those experienced by a transported article*, comprising:

three accelerometer means for sensing accelerations in three orthogonal directions *corresponding to accelerations experienced by a transported article* and producing analog signals [correspnding] *corresponding* to the accelerations in each of the three directions;

clock means for producing a digital timer signal;

read-only memory means for storing program instructions;

digital memory means adapted to receive digital signals and store data representing the digital signals; and microprocessor means[,] including analog-to-digital converter means for producing digital signals representing the analog signals produced by each of the three accelerometer means, arithmetic logic means adapted to receive, from the analog-to-digital converter means, the digital signals quantifying the acceleration in each of the three orthogonal directions, for processing the digital signals, and communication means for communicating digital information with an external device,

*wherein* the microprocessor [being] *means is* connected to the clock means, the read-only memory means, and the digital memory means and adapted to read the program instructions from the read-only memory means, for causing the data representing both the digital signals produced by the [transducer] *accelerometer* means during an interval of time of predetermined duration and the digital timer signal produced by the clock means at the beginning of the interval of time to be stored in the *digital* memory means, the interval of time beginning when at least one of the accelerations satisfies a predetermined criterion, for controlling the reading of the stored data in the digital memory means, and for communicating the data stored in the digital memory means with the external device.

22. An event detector/recorder that can be contained within a housing *for detecting and recording acceleration events corresponding to those experienced by a transported article,* comprising:

transducer means for sensing one or more physical quantities *at least one of which corresponding to accelerations experienced by a transported article* and for producing digital signal quantifying the sensed physical quantities;

clock means for producing a digital timer signal;

memory means for storing program instructions and for storing data representing digital signals;

communication means for communicating digital information with a separate device; and microprocessor means connected to the transducer means, the clock means, the memory means, and the communication means, and being adapted to read and execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the physical quantities satisfies a predetermined criterion and for controlling the communication means to communicate digital information with the separate device.

25. An acceleration event detector/recorder, comprising:

a housing constructed to approximate an article of commerce, such as a fruit, in size, shape, and mass, so that the acceleration events experienced by the housing can be correlated to those experienced by the article which the housing approximates;

three accelerometer means for sensing accelerations in three orthogonal directions and producing analog signals corresponding to the accelerations in each of the three directions;

clock means for producing a digital timer signal;

read-only memory means for storing program instructions;

digital memory means adapted to receive digital signals and store data representing the digital signals; and microprocessor means, including analog-to-digital converter means for producing digital signals representing the analog signals produced by each of the three accelerometer means, arithmetic logic means adapted to receive, from the analog-to-digital converter means, the digital signals quantifying the acceleration in each of three orthogonal directions, for processing the digital signals, and communication means for communicating digital information with an external device, the microprocessor *means* being connected to the clock means, the read-only memory means, and the digital memory means and adapted to read the program instructions from the read-only memory means, for causing the data representing both the digital signals produced by the [transducer] *accelerometer* means during an interval of time of predetermined duration and the digital timer signal produced by the clock means at the beginning of the interval of time to be stored in the *digital* memory means, the interval of time beginning when at least one of the accelerations satisfies a predetermined criterion, for controlling the reading of the stored data in the digital memory means, and for communicating the data stored in the digital memory means with the external device.

28. The acceleration event detector/recorder as defined in claim 2 and further comprising:

*a housing adapted to be attached to an article of commerce with which the acceleration event detector/recorder is to be transported, for containing said transducer means, said clock means, said memory means, said communication means, and said microprocessor means,*

*wherein said transducer means senses acceleration events experienced by said housing which can be correlated to those experienced by the article of commerce.*

29. *The acceleration event detector/recorder as defined in claim 2 and further comprising:*

*a housing having the approximate the size, weight, and shape, of an article of commerce with which the acceleration event detector/recorder is to be transported, for containing said transducer means, said clock means, said memory means, said communication means, and said microprocessor means,*

*wherein said transducer means senses acceleration events experienced by said housing which can be correlated to those experienced by the article of commerce which said housing approximates.*

30. *The acceleration event detector/recorder as defined in claim 2, wherein said transducer means includes at least two accelerometers and said microprocessor means includes an interrupt timer for generating interrupt signals at predetermined second time intervals, wherein said microprocessor means receives the digital signals from said accelerometers each time said interrupt timer generates an interrupt signal and determines whether at least one of the physical quantities represented by the received digital signals satisfy the predetermined criterion, and wherein said predetermined second time interval is longer than any time occurring between the digital signal provided by said accelerometers.*

31. *The acceleration event detector/recorder as defined in claim 2 and further including a housing for containing said clock means, said memory means, said communication means, and said microprocessor means, wherein said communication means directly communicates the digital information with the separate device, which is a computer terminal, by means of a serial port and line connected between the computer terminal and said housing in compliance with RS232 asynchronous timing, wherein said microprocessor means is independent of external control in use for sensing the physical variables, and wherein the computer terminal is used to download program instructions to said memory means.*

32. *The acceleration event detector/recorder as defined in claim 15 and further comprising:*

*a housing adapted to be attached to an article of commerce with which the acceleration event detector/recorder is to be transported, for containing said three accelerometer means, said clock means, said read-only memory means, said digital memory means, and said microprocessor means,* wherein said three accelerometer means sense acceleration events experienced by said housing which can be correlated to those experienced by the article of commerce.

33. The acceleration event detector/recorder as defined in claim 15 and further comprising:

a housing having the approximate the size, weight, and shape, of an article of commerce with which the acceleration event detector/recorder is to be transported, for containing said three accelerometer means, said clock means, said read-only memory means, said digital memory means, and said microprocessor means, wherein said three accelerometer means sense acceleration events experienced by said housing which can be correlated to those experienced by the article of commerce which said housing approximates.

34. The acceleration event detector/recorder as defined in claim 15, said microprocessor means includes an interrupt timer for generating interrupt signals at predetermined second time intervals, wherein said microprocessor means receives the digital signals from said analog-to-digital converter means each time said interrupt timer generates an interrupt signal and determines whether at least one of the physical quantities represented by the received digital signals satisfy the predetermined criterion, and wherein said predetermined second time interval is longer than any time occurring between the analog signals provided by said three accelerometer means.

35. The acceleration event detector/recorder as defined in claim 15 and further including a housing for containing said clock means, said digital memory means, said read-only means, and said microprocessor means, wherein said communication means directly communicates the digital information with the external device, which is a computer terminal, by means of a serial port and line connected between the computer terminal and said housing in compliance with RS232 asynchronous timing, wherein said microprocessor means is independent of external control in use for sensing the physical variables, and wherein the computer terminal is used to download program instructions to said read-only memory means.

36. The acceleration event detector/recorder as defined in claim 22 and further comprising:

a housing adapted to be attached to an article of commerce with which the acceleration event detector/recorder is to be transported, for containing said transducer means, said clock means, said memory means, said communication means, and said microprocessor means, wherein said transducer means senses acceleration events experienced by said housing which can be correlated to those experienced by the article of commerce.

37. The acceleration event detector/recorder as defined in claim 22 and further comprising:

a housing having the approximate the size, weight, and shape, of an article of commerce with which the acceleration event detector/recorder is to be transported, for containing said transducer means, said clock means, said memory means, said communication means, and said microprocessor means, wherein said transducer means senses acceleration events experienced by said housing which can be correlated to those experienced by the article of commerce which said housing approximates.

38. The acceleration event detector/recorder as defined in claim 22, wherein said transducer means includes at least two accelerometers and said microprocessor means includes an interrupt timer for generating interrupt signals at predetermined second time intervals, wherein said microprocessor means receives the digital signals from said accelerometers each time said interrupt timer generates an interrupt signal and determines whether at least one of the physical quantities represented by the received digital signals satisfy the predetermined criterion, and wherein said predetermined second time interval is longer than any time occurring between the digital signals provided by said accelerometers.

39. The acceleration event detector/recorder as defined in claim 22 and further including a housing for containing said clock means, said memory means, said communication means, and said microprocessor means, wherein said communication means directly communicates the digital information with the separate device, which is a computer terminal, by means of a serial port and line connected between the computer terminal and said housing in compliance with RS232 asynchronous timing, wherein said microprocessor means is independent of external control in use for sensing the physical variables, and wherein the computer terminal is used to download program instructions to said memory means.

40. The method as defined in claim 1, wherein the sensed physical variables are acceleration events and the predetermined criterion that the acceleration events must meet to begin the intervals of predetermined duration is reaching a threshold acceleration level.

41. The method as defined in claim 40, wherein the predetermined criterion that the acceleration events must meet to begin the intervals of predetermined duration is exceeding said threshold acceleration level.

42. The method as defined in claim 1, wherein the intervals of the time history end upon the occurrence of a detected event.

43. The method as defined in claim 42, wherein the detected event is the storing of the last of a predetermined number of samples of the sensed physical variables.

44. The acceleration event detector/recorder as defined in claim 2, wherein the predetermined criterion that the accelerations must meet to begin the interval of predetermined duration is reaching a threshold acceleration level.

45. The acceleration event detector/recorder as defined in claim 44, wherein the predetermined criterion that the accelerations must meet to begin the interval of predetermined duration is exceeding said threshold acceleration level.

46. The acceleration event detector/recorder as defined in claim 2, wherein the interval of predetermined duration ends upon the occurrence of a detected event.

47. The acceleration event detector/recorder as defined in claim 46, wherein the detected event is the storing of the last of a predetermined number of samples of the accelerations.

48. The acceleration event detector/recorder as defined in claim 15, wherein the predetermined criterion that the accelerations must meet to begin the interval of predetermined duration is reaching a threshold acceleration level.

49. The acceleration event detector/recorder as defined in claim 48, wherein the predetermined criterion that the accelerations must meet to begin the interval of predetermined duration is exceeding said threshold acceleration level.

50. The acceleration event detector/recorder as defined in claim 15, wherein the interval of predetermined duration ends upon the occurrence of a detected event.

51. The acceleration event detector/recorder as defined in claim 50, wherein the detected event is the storing of the last of a predetermined number of samples of the accelerations.

52. The event detector/recorder as defined in claim 22, wherein the sensed physical quantities are acceleration events and the predetermined criterion that the acceleration events must meet to begin the interval of predetermined duration is reaching a threshold acceleration level.

53. The event detector/recorder as defined in claim 52, wherein the predetermined criterion that the acceleration events must meet to begin the interval of predetermined duration is exceeding said threshold acceleration level.

54. The event detector/recorder as defined in claim 22, wherein the interval of predetermined duration ends upon the occurrence of a detected event.

55. The event detector/recorder as defined in claim 54, wherein the detected event is the storing of the last of a predetermined number of samples of the acceleration events.

56. The method as defined in claim 24, wherein the predetermined criteria that the acceleration events must meet to begin the intervals of predetermined duration is reaching a threshold acceleration level.

57. The method as defined in claim 56, wherein the predetermined criteria that the acceleration events must meet to begin the intervals of predetermined duration is exceeding said threshold acceleration level.

58. The method as defined in claim 24, wherein the intervals of predetermined duration end upon the occurrence of a detected event.

59. The method as defined in claim 58, wherein the detected event is the storing of the last of a predetermined number of samples of the acceleration events.

* * * * *

REEXAMINATION CERTIFICATE (4110th)
United States Patent [19]
Tennes et al.

[11] B2 4,745,564
[45] Certificate Issued Jul. 4, 2000

[54] IMPACT DETECTION APPARATUS

[75] Inventors: Bernard R. Tennes, Charlotte; Galen K. Brown, Okemos; Joseph R. Clemens; Henry A. Affeldt, both of East Lansing, all of Mich.; Siamak Siyami, Tehran, Islamic Rep. of Iran; Brian A. Klug, Buchanan; Hans R. Zapp, Okemos, both of Mich.

[73] Assignee: The United States of America as represented by the Secretary of Agriculture, Washington, D.C.

Reexamination Request:
No. 90/004,580, Mar. 14, 1997

Reexamination Certificate for:
Patent No.: 4,745,564
Issued: May 17, 1988
Appl. No.: 06/827,142
Filed: Feb. 7, 1986

Reexamination Certificate B1 4,745,564 issued Feb. 11, 1997

[51] Int. Cl.[7] ................... G01P 15/04; G01P 1/14
[52] U.S. Cl. ................... 702/141; 73/492; 73/493; 73/489; 346/33 D; 346/33 R; 374/102; 374/170; 702/187
[58] Field of Search ................... 702/141, 175, 702/187, 189; 73/12.01, 488, 489, 491, 492, 493; 346/33 R, 33 D; 360/5

[56] References Cited

U.S. PATENT DOCUMENTS 3,623,449  11/1971  Knutson .
3,781,824  12/1973  Caiatl et al. .
3,909,568   9/1975  Greenhug .
4,110,684   8/1978  Gale .
4,134,149   1/1979  Nord .
4,362,986  12/1982  Burke et al. .

OTHER PUBLICATIONS

"Hewlett Packard Measurement/Computation Electronic Instruments and Systems 1983," pp. 170–173 (1983).
"Data Recorders: Principles and Applications" by Kawai (Test and Measurement World, Oct. 1984).
"Smartscope Bringing Intelligence to Waveform Analysis" (T.G. Branden Corporation, 1979).
"1923 Time Series Systems 1923–0100 Operating Manual" (Time/Data A GR Company, Jul. 1972).
"Digital Storage Oscilloscope PM3311(U) Operating Manual" (Philips, 1982).
"5223 Option 10 (GPIB) Digitizing Oscilloscope Operators Manual" (Tektronix, Inc., Oct. 1981).
"Triad II Computing Transient Recorder System" (GHI Systems, Incorporated Data Sheet 281, Feb. 1981).
"The VK Transient Recorder for . . . Fast, High Resolution Transient and Repetitive Signal Recording" (GHI Systems, Incorporated Data Sheet 380, 1980).

(List continued on next page.)

*Primary Examiner*—Patrick Assouad

[57]    ABSTRACT

An apparatus for measuring and recording accelerations or other physical quantities experienced by easily damaged items of commerce such as fruit and electronic computers. A triaxial accelerometer or other suitable sensor produces signals which are sampled by a microprocessor operating according to a program stored in a read-only memory. When the sampled accelerations or other physical quantities exceed a predetermined threshold, samples are stored in a random access memory, along with their times of occurrence. The apparatus provides a serial port for reading out the recorded acceleration data. The data may then be subjected to further processing externally.

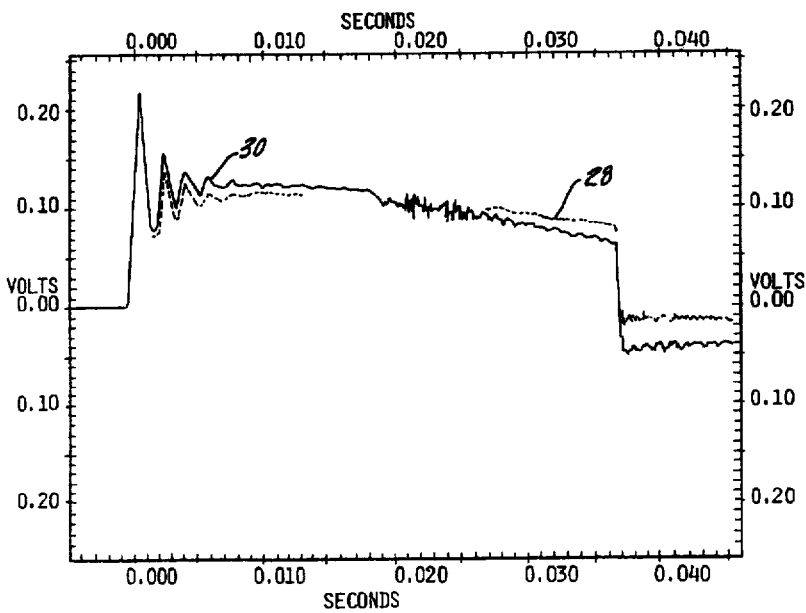

OTHER PUBLICATIONS

"Vuko Transientrecorder Translenten Recorder VK 12-2" (Vuko Elektronische Gerate GmbH, 1983).

"Instruction Manual Model 3655 Analyzing Recorder" (Yokogawa Hokushin Electric, Jul. 1984).

"Endevco Product Development News" vol. 10, No. 5 (1974).

"Endevco Product Development News" vol. 14, Issue 3 (1978).

"SD330A Spectrascope Real Time Analyzer" (Spectral Dynamics Corporation, Apr. 1974).

"Instruments That Think for Themselves" by Comella (Machine Design, Jul. 26, 1975).

"Modern Data Acquisition is Complex" by Morgan (Electronic Design, pp. 60–66, Oct. 25, 1977).

"Measuring Shock and Vibration" by Bredin (Mechanical Engineering, pp. 30–36, Feb. 1983).

"Endevco Product Development News" vol. 15, Issue 3 (1979).

"Endevco Product Development News" vol. 13, Issue 3 (1977).

"Endevco Product Development News" vol. 12, No. 2 (1976).

"The Accurate Measurement of Shock Phenomena" by Riedel (Endevco Tech Paper 214, Revision of Nov. 1966).

"Seminar on Selection and Use of Accelerometers" by Burger et al. (Presented to the ASTM D10, 16 Committe on Packaging Instrumentation, Oct. 13, 1983).

"An On–Board Microprocessor–Based Data Processor/Recorder" by Johnson (SAE Technical paper Series 810903, 1981).

"Sound and Vibration Measuring Instrumentation" by Kamperman (Sound and Vibration, Jan. 1977).

"A High Performance Digital Vibration Control and Analysis System" by Helzman (Presented at IES [Institute for Environmental Sciences] 18th Annual Meeting [1972]).

"Fundamentals of Packaging Dynamics" by Brandenburg et al., pp. 73–120 (1985).

"A Simple Discussion of Time–Series Analysis" by Chamberlain (Oct. 1972).

"Bridging the Gap" by Roth (Industrial Research/Development, May 1979).

"Basics of Choosing a Waveform Digitizer" by Ramirez (Test and Measurement World, Oct. 1984).

"A New Look at Transportation Vibration Statistics" by Schlue et al. (Jet Propulsion Laboratory Under NASA Contract NAS 7-100).

"The Rail Transport Environment" by Gens (The Journal of Environmental Sciences, Jul./Aug. 1970).

"Normal and Abnormal Dynamic Environments Encountered in Truck Transportation" by Foley (Shock and Vibration Bulletin, Mar. 1969).

"Techniques for Measuring Transportation and Handling Environments" by Foley (Sandia Laboratories SC-M-60-266, Jun. 1970).

"Shock and Vibration Environment in a Livestock Trailer" by Turczyn et al. (The Shock and Vibration Bulletin 50. Sep. 1980).

"Preliminary Measurement and Analysis of the Vibration Environment of Common Motor Carriers" by Sharpe et al. (Michigan State University Scholl of Packaging Technical Report No. 22, Sep. 1, 1973).

"'You'll Never See It from the Road': An Examination of the Response of Lading to Transient Excitation by Three Truck Suspension Systems" by Goff et al. (Michigan State University Scholl of Packaging Technical Report No. 26, Nov. 1984).

"A Microcomputer–Based System for Instrumented Impact Testing" by Crawford et al. (Journal of Testing and Evaluation, pp. 121-126, 1982).

"Shock–Testing Under Minicomputer Control" by Barthmeier (Institute of Environmental Sciences 1974 Proceedings, 1974).

"Shock Testing: The Digitizing Approach" by Hurlock (South and Vibration, Aug. 1983).

"Design and Application of an Instrumented Falling Weight Impact Tester" by Wnuk et al. (Polymer Engineering and Science, vol. 21, No. 6, Apr. 1981).

"The Development of a Telemetry Shock Measuring System" by Goff et al. (Michigan State University School of Packaging Technical Report No. 14, Apr. 17, 1968).

"On–Board Data Recorder for Hard Target Weapons" by Niven et al. (Lawrence Livermore Laboratory, Mar. 16, 1981).

"Digital Recording of Vehicle Crash Data" by Fouts et al. (SAE Technical Paper Series 810810, 1981).

"Weapon Performance Recorder System" by Ferranti (1979).

"A Portable Electronic Vehicle Use Recorder" by Blevins et al. (SAE Technical Paper Series 840312, 1984).

"The Data Acquisition System at the DCIEM Impact Studies Facility" by Bowden et al. (SAE Technical Paper Series 810812, 1981).

"A Microcomputer–Based On–Vehicle Data Acqustion System" by Bowersock et al. (SAE Technical Paper Series 810811, 1981).

"Advanced Automotive Crash Recorder Design Development and Test Analysis" by Klaber (SAE Technical Paper Series, 1981).

"Introduction to Mini and Microcomputer Based Field Data Collection Systems" by Johnson et al. (SAE Technical Paper Series, 1981).

"A Microprocessor–Based Recorder System for Data Logging in Customer and Long–Term–Test Vehicles" by Tscheuschner et al. (SAE Technical Paper Series 810459, 1981).

"What Really Happens to Your Package In Trucks and Trailers?" by Winne (PI/USA Western Regional Packaging Forum, Jul. 19-20, 1977).

"The Dynamic Environment of Spacecraft Surface Transportation" by Schlue (Jet Propulsion Laboratory Technical Report No. 32-876, Mar. 15, 1966).

"The Military Logistical Transportation Vibration Environment: Its Characterization and Relevance to MIL-STD Fuze Vibration Testing" by Tevelow (U.S. Army Report No. HDL-SR-83-11, Dec. 1983).

"Impact Analysis of Viscoelastic Spheres, Fruits and Vegetables with Rigid, Plane Surfaces," Ph.D. dissertation by Lichtenstelger (Ohio State Univesity 1982).

"Impact Testing of Fruits and Vegetables" by Fluck et al., Transactions of the ASAE, pp. 660–666, (1973).

"Instrumentation for Testing the Response of Fruits to Mechanical Impact" by Finney et al., Transactions of the ASAE, pp. 1184–1187 (1975).

"Impact Characteristics of Storage Cabbage," by Bartsch et al., ASAE Paper No. 82-3080 (Jun. 27-30, 1982).

"Designing an instrumented Test Egg for Detecting Impact Breakage," by Shupe et al., The Shock & Vibration Bulletin, 41(3):11–16 (1970).

"A New Digital Transient Recorder," by Schneider, *Sound and Vibration*, pp., 4–7 (Apr. 1973).

"Transient Capture and Display Techniques," by Wilson, *Sound and Vibration*, p. 16 (Apr. 1975).

"Navy Automates Shock Testing with Desktop Computers," *Sound and Vibration*, pp. 6–8 (Nov. 1981).

Advertisement for the LeCroy Model TR8837F Transient Recorder, *Sound and Vibration*, p. 40 (Mar. 1983).

"Digital Oscilloscope Simplifies Shock Tests," *Sound and Vibration*, pp. 6–10 (Apr. 1984).

Advertisement for the Data Precision Data 6000 Universal Waveform Analyzer, *Sound and Vibration*, p. 4 (Nov. 1984).

"DL1080 Programmable Transient Recorder Operating Manual," (Data Laboratories Limited 1982).

"DL1200 Multichannel Waveform Recorder Operating Manual Doc. No. OM0010" (Lucas DataLab Limited; original manual published Apr. 6, 1983; submitted manual published Jan. 7, 1986).

"The Baseline Navy Recorder" by Niven et al. (Jan. 7, 1981).

"On–Board Digital Processing Refines Scope Measurements" by Garuts et al. (Electronics, pp. 105–114, Mar. 13, 1980).

"Model 805 Waveform Recorder Operating and Service Manual" (Biomation, Oct. 17, 1975).

"Model 1015 Waveform Recorder Operating and Service Manual" (Biomation, Feb. 28, 1975).

"3001 Processing Digital Oscilloscope User Reference Manual No. 208M273A" (Norland Corporation, Nov. 17, 1980).

"Operation and Maintenance Manual Microcorder, Model MCR–600" (Teledyne Geotech, Jan. 10, 1980).

"Mass Storage Digital Ocean Bottom Seismometer and Hydrophone (DOBSH) Controlled by Micro–processors Using ADPCM Voice Synthesizing" by Kasahara et al. (Bulletin of the Earthquake Research Institute, vol. 60, pp. 23–37, 1985).

A General Earthquake–Observation System (GEOS) by Borcherdt et al. (Bulletin of the Seismological Society of America, vol. 75, No. 6, pp. 1783–1825, Dec. 1985).

"A Free Fall Seismic Capsule for Seismicity and Refraction Work" by Prothero (Offshore Technology Conference Paper No. OTC 2440, 1976).

"CMOS Microcomputer Simplifies System Design" by Redofrd (SAE Technical Paper Series 810305, Feb. 23–27, 1981).

"Microcontroller Handbook" pp. 23–5 through 23–16 (Intel 1984).

"A Microprocessor Controlled Recorder for Fatigue Load Measurements on Board of Long–Term–Test Vehicles" by Tscheuschner et al. (SAE Technical Paper Series 840502, Feb. 27–Mar. 2, 1984).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–28, 30–32, 34–36 and 38–59 is confirmed.

Claims 29, 33 and 37 are determined to be patentable as amended.

New claims 60–73 are added and determined to be patentable.

29. [The] *An* acceleration event detector/recorder [as defined in claim 2 and further] *that can be contained within a housing for detecting and recording acceleration events corresponding to those experienced by a transported article, comprising:*

*transducer means for sensing accelerations along at least one axis corresponding to accelerations experienced by a transported article, and for producing digital signals quantifying the sensed physical quantities;*

*clock means for producing a digital timer signal;*

*memory means for storing program instructions and for storing data representing digital signals;*

*communication means for communicating digital information with a separate device;*

*microprocessor means connected to the transducer means, the clock means, the memory means, and the communicating means, and being adapted to read and execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the accelerations satisfies a predetermined criterion and for controlling the communication means to communicate digital information with the separate device; and* a housing having the approximate the size, weight, and shape, of an article of commerce with which the acceleration event detector/recorder is to be transported, for containing said transducer means, said clock means, said memory means, said communication means, and said microprocessor means, wherein said transducer means senses acceleration events experienced by said housing which can be correlated to those experienced by the article of commerce which said housing approximates.

33. [The] *An* acceleration event detector/recorder [as defined in claim 15 and further] *that can be contained within a housing for detecting and recording acceleration events corresponding to those experienced by a transported article, comprising:*

*three accelerometer means for sensing accelerations in three orthogonal directions corresponding to accelerations experienced by a transported article and producing analog signals corresponding to the accelerations in each of the three directions;*

*clock means for producing a digital timer signal;*

*read-only memory means for storing program instructions;*

*digital memory means adapted to receive digital signals and store data representing the digital signals;*

*microprocessor means including*

*analog-to-digital converter means for producing digital signals representing the analog signals produced by each of the three accelerometer means,*

*arithmetic logic means adapted to receive, from the analog-to-digital converter means, the digital signals quantifying the acceleration in each of the three orthogonal directions, for processing the digital signals, and*

*communication means for communicating digital information with an external device,*

*wherein the microprocessor means is connected to the clock means, the read-only memory means, and the digital memory means and adapted to read the program instructions from the read-only memory means, for causing the data representing both the digital signals produced by the accelerometer means during an interval of time of predetermined duration and the digital timer signal produced by the clock means at the beginning of the interval of time to be stored in the digital memory means, the interval of time beginning when at least one of the accelerations satisfies a predetermined criterion, for controlling the reading of the stored data in the digital memory means, and for communicating the data stored in the digital memory means with the external device; and* a housing having the approximate the size, weight, and shape, of an article of commerce with which the acceleration event detector/recorder is to be transported, for containing said three accelerometer means, said clock means, said read-only memory means, said digital memory means, and said microprocessor means, wherein said three accelerometer means sense acceleration events experienced by said housing which can be correlated to those experienced by the article of commerce which said housing approximates.

37. [The] *An* acceleration event detector/recorder [as defined in claim 22 and further] *that can be contained within a housing for detecting and recording acceleration events corresponding to those experienced by a transported article, comprising:*

*transducer means for sensing one or more physical quantities at least one of which corresponding to accelerations experienced by a transported article and for producing digital signal quantifying the sensed physical quantities;*

*clock means for producing a digital timer signal;*

*memory means for storing program instructions and for storing data representing digital signals;*

*communication means for communicating digital information with a separate device;*

*microprocessor means connected to the transducer means, the clock means, the memory means, and the communication means, and being adapted to read and* execute the program instructions from the memory means, for causing the data representing both the digital signals produced by the transducer means during an interval of time of predetermined duration and the digital timer signal produced by the clock means at the beginning of the interval of time to be stored in the memory means, the interval of time beginning when at least one of the physical quantities satisfies a predetermined criterion and for controlling the communication means to communicate digital information with the separate device; and a housing having the approximate the size, weight, and shape, of an article of commerce with which the accleration event detector/recorder is to be transported, for containing said transducer means, said clock means, said memory means, said communication means, and said microprocessor means, wherein said transducer means senses acceleration events experienced by said housing which can be correlated to those experienced by the article of commerce which said housing approximates.

60. The acceleration event detector/recorder as defined in claim 2, wherein said microprocessor means is capable of recording multiple events by causing the data for both the digital signals produced by the transducer means during subsequent intervals of time of predetermined duration and the digital timer signal produced by the clock means at the beginning of each interval of time to be stored in the memory means, each new interval of time beginning when at least one of the acceleration satisfies a predetermined criterion.

61. The acceleration event detector/recorder as defined in claim 15, wherein said microprocessor means is capable of recording multiple events by causing the data for both the digital signals produced by the accelerometer means during subsequent intervals of time of predetermined duration and the digital timer signal produced by the clock means at the beginning of each interval of time to be stored in the digital memory means, each new interval of time beginning when at least one of the accelerations satisfies a predetermined criterion.

62. The event detector/recorder as defined in claim 22, wherein said microprocessor means is capable of recording multiple events by causing the data for both the digital signals produced by the transducer means during subsequent intervals of time of predetermined duration and the digital timer signal produced by the clock means at the beginning of each interval of time to be stored in the memory means, each new interval of time beginning when at least one of the physical quantities satisfies a predetermined criterion.

63. The method as defined in claim 1, wherein the item subjected to handling is an article of commerce and said transducer means sense values of physical variables that are substantially similar to the physical variables affecting the article of commerce.

64. The acceleration event detector/recorder as defined in claim 2, wherein the transported article is an article of commerce and the accelerations sensed by said transducer means are substantially similar to accelerations affecting the article of commerce.

65. The acceleration event detector/recorder as defined in claim 15, wherein the transported article is an article of commerce and the accelerations sensed by said accelerometer means are substantially similar to accelerations affecting the article of commerce.

66. The event detector/recorder as defined in claim 22, wherein the transported article is an article of commerce and the physical quantities sensed by said transducer means are substantially similar to physical quantities affecting the article of commerce.

67. The method as defined in claim 24, wherein the damageable item is an article of commerce and transducer means sense accelerations that are substantially similar to accelerations experienced by the article of commerce.

68. The method as defined in claim 1, wherein said transducer means is configured to sense accelerations of at least about 200 g.

69. The acceleration event detector/recorder as defined in claim 2, wherein said transducer means is configured to sense accelerations of at least about 200 g.

70. The acceleration event detector/recorder as defined in claim 15, wherein said accelerometer means are configured to sense accelerations of at least about 200 g.

71. The event detector/recorder as defined in claim 22, wherein said transducer means is configured to sense accelerations of at least about 200 g.

72. The method as defined in claim 24, wherein said transducer means is configured to sense accelerations of at least about 200 g.

73. The acceleration event detector/recorder as defined in claim 25, wherein said accelerometer means are configured to sense accelerations of at least about 200 g.

* * * * *